United States Patent
Miller et al.

(10) Patent No.: US 8,438,909 B2
(45) Date of Patent: May 14, 2013

(54) DEVICE AND METHOD FOR DETECTING AN AIR LEAK IN A TOOL

(75) Inventors: Finley B. Miller, Huntington Beach, CA (US); Michael E. Benne, St. Paul, MO (US); Kenneth M. Dull, Puyallup, WA (US)

(73) Assignee: The Boeing Company, Chicago, IL (US)

( * ) Notice: Subject to any disclaimer, the term of this patent is extended or adjusted under 35 U.S.C. 154(b) by 444 days.

(21) Appl. No.: 12/725,380

(22) Filed: Mar. 16, 2010

(65) Prior Publication Data

US 2010/0170326 A1    Jul. 8, 2010

Related U.S. Application Data

(63) Continuation-in-part of application No. 11/829,900, filed on Jul. 28, 2007, now Pat. No. 7,849,729.

(60) Provisional application No. 60/876,928, filed on Dec. 22, 2006.

(51) Int. Cl.
- *G01M 3/34*     (2006.01)
- *B29C 49/00*    (2006.01)
- *B29C 45/76*    (2006.01)
- *G01N 31/00*    (2006.01)

(52) U.S. Cl.
USPC ............. 73/49.3; 264/571; 264/40.1; 436/3

(58) Field of Classification Search .... 73/49.3; 264/571; 436/3
See application file for complete search history.

(56) References Cited

U.S. PATENT DOCUMENTS

| | | | |
|---|---|---|---|
| 3,739,166 A | 6/1973 | Anderson | |
| 4,548,859 A * | 10/1985 | Kline et al. | 442/312 |
| 5,359,887 A | 11/1994 | Schwab | |
| 5,180,046 A | 11/1995 | Kershaw | |
| 5,612,492 A | 3/1997 | Schwab | |
| 5,780,721 A | 7/1998 | Levens | |
| 6,696,690 B2 | 2/2004 | Benne | |
| 6,830,079 B1 | 12/2004 | Ahrens | |
| 7,127,950 B2 | 10/2006 | Fonov | |

(Continued)

FOREIGN PATENT DOCUMENTS

| | | |
|---|---|---|
| DE | 2005056391 | 6/2005 |
| EP | 629497 | 12/1994 |
| JP | 2004-309379 | 4/2003 |
| WO | US2007/023455 | 12/2006 |

OTHER PUBLICATIONS

UK Intellectual Property Office, UK Search Report, dated Jul. 15, 2011.

(Continued)

*Primary Examiner* — Hezron E Williams
*Assistant Examiner* — Nathaniel Kolb
(74) *Attorney, Agent, or Firm* — Novatech IP Law

(57) ABSTRACT

A device for detecting an air leak in a tool comprises a vacuum bag and a leak detection film disposed along an inside face of the vacuum bag. The leak detection film may include oxygen sensitive material configured to change physical appearance at a location of an air leak in the tool. A breather layer may be interposed between the tool and the leak detection film for facilitating air flow therebetween.

17 Claims, 15 Drawing Sheets

U.S. PATENT DOCUMENTS

2002/0060018 A1    5/2002   Lindsay
2005/0086916 A1    4/2005   Caron
2006/0121613 A1*   6/2006   Havens ............................ 436/3
2007/0272582 A1   11/2007   Lau
2008/0148817 A1    6/2008   Miller et al.
2009/0273107 A1   11/2009   Advani

OTHER PUBLICATIONS

Sieberg et al., "An advanced FRP manufacturing technique asserts itself: Practical experience with the vacuum injection process," Studiedag Vakuuminjecteren, XP002169062, Oct. 27, 1998, pp. 13-19. (English translation of German-language article, allached).

* cited by examiner

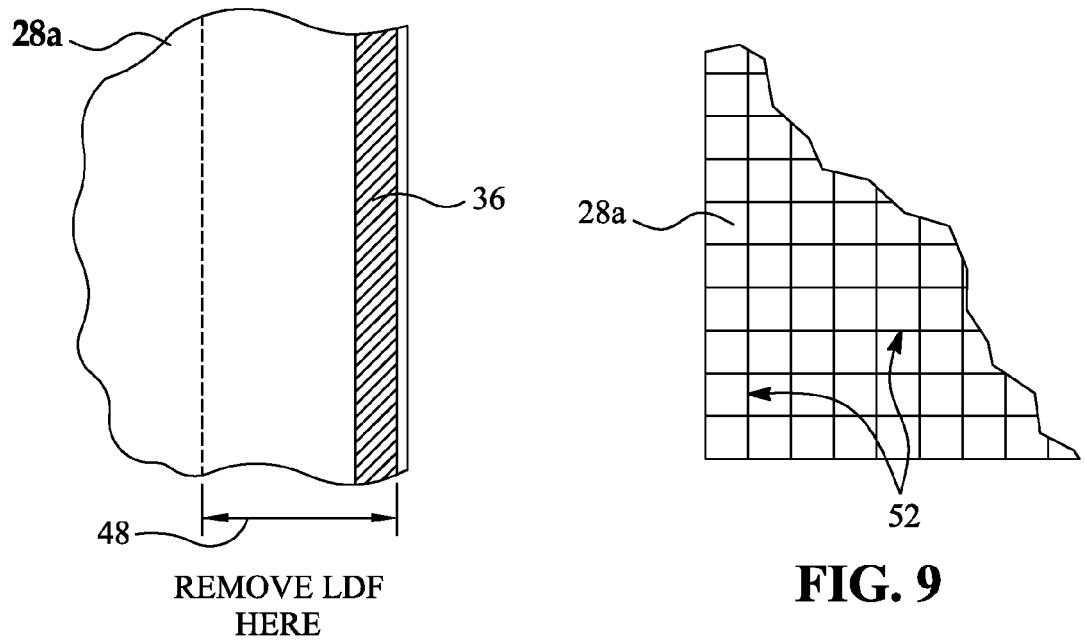
FIG. 8
REMOVE LDF HERE
FIG. 9
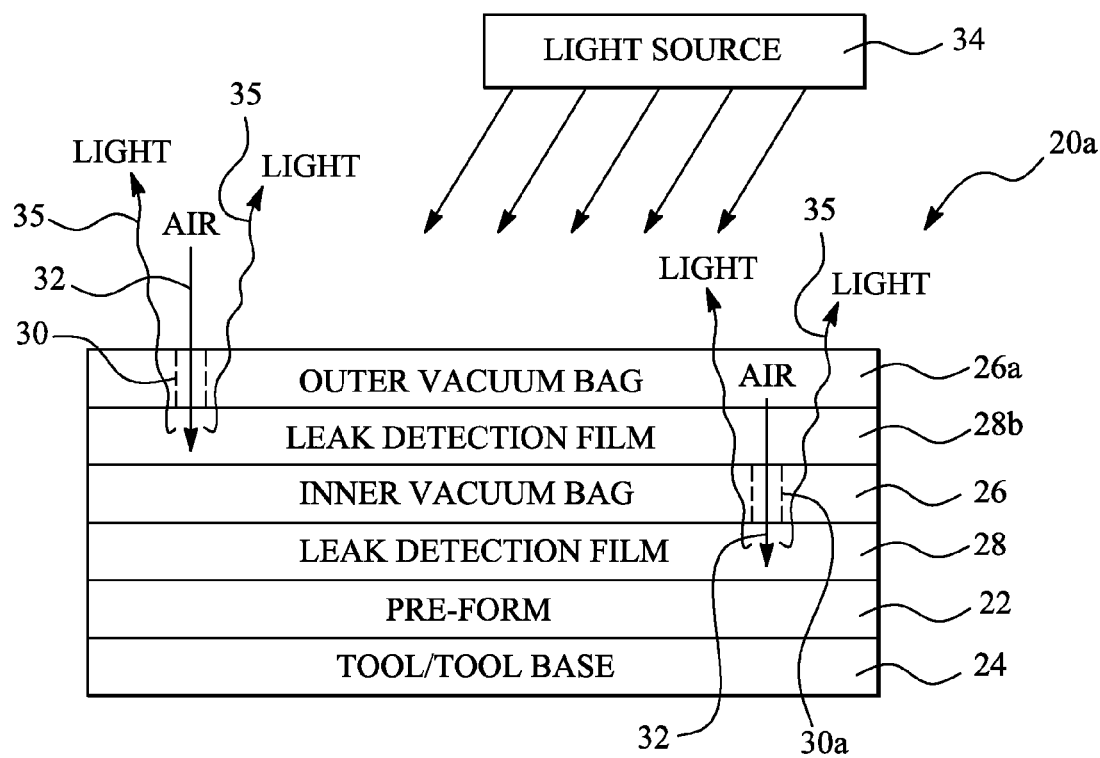
FIG. 10

DEVICE AND METHOD FOR DETECTING AN AIR LEAK IN A TOOL

CROSS-REFERENCE TO RELATED APPLICATIONS

The present application is a continuation-in-part application of pending application Ser. No. 11/829,900 filed on Jul. 28, 2007 and entitled LEAK DETECTION IN VACUUM BAGS, which clams the benefit of Provisional U.S. Patent Application Ser. No. 60/876,928 filed Dec. 22, 2006, the entire contents of each application being expressly incorporated by reference.

STATEMENT RE: FEDERALLY SPONSORED RESEARCH/DEVELOPMENT (Not Applicable)

FIELD

The present disclosure relates generally to tooling used in manufacturing and industrial processes and, more particularly, to a device and method for detecting air leaks in tooling for manufacturing composite articles.

BACKGROUND

Vacuum bags and composite layup tools are used in various manufacturing and industrial processes such as the fabrication of composite structures and bonding of parts. For example, in the aerospace industry, without limitation, vacuum bags may be used to bond heat shield tiles to a metal backing. Vacuum bags may also be used in vacuum bag molding wherein a flexible bag formed from a polymer sheet such as Nylon® is placed over a part pre-form and sealed along a mold flange. A vacuum drawn on the bag eliminates entrapped air and excess resin resulting in compaction of the pre-form. In addition, vacuum bags may be used to consolidate prepreg composite structures such as during curing of a composite structure.

Similarly, vacuum assisted resin transfer molding (VARTM) may employ a vacuum bag to cover a pre-form or dry fabric on one-sided tooling. Air is evacuated and liquid resin from an external reservoir is drawn into the bag which is infused into the pre-form. Any leaks in the vacuum bag may allow air to enter and form bubbles in the resin matrix resulting in an unacceptable amount of porosity in the matrix. Leaks in the vacuum bag may be relatively small and therefore difficult to observe by an operator. While various gas leak detection techniques are known, they are not always reliable and may not detect leaks quickly enough to be useful in repairing leaks while molding processes are underway.

Tools for manufacturing composite articles may also occasionally include leaks which may affect the quality of the cured composite structure. For example, composite tools for relatively large structures may be formed as a welded structure which may then be machined into the final shape of the tool. Leaks may be present in the weld and which may go undetected during the initial usage of the tool. Composite structures formed on such tools may include undesirable effects as a result of exposure of the composite layup to air leaks in the tool. Composite structures formed on carbon fiber tools may likewise include undesirable effects due to air leaks in the tool. Such leaks may occur as a result of micro-cracking due to repeated thermal cycling as the tool is heated to a high temperature for curing a composite part after which the tool may be cooled to room temperature. Such micro-cracking may result from the difference in the coefficient of thermal expansion of the carbon fibers relative to the lower coefficient of thermal expansion of the resin and which may result in shrinking of the resin at a higher rate than the carbon fibers during cool down.

Prior art attempts at detecting leaks in tools include a system where a three-ply layup of fiberglass pre-impregnated material is applied to the tool. The fiberglass part is vacuum-bagged on the tool and cured. The cured fiberglass part is then inspected for indications of tool leaks which may appear as air bubbles in the cured fiberglass part. An autoclave may be used for curing the fiberglass part. Unfortunately, if the tool maker lacks an autoclave, the tool must be shipped to the production facility without first checking for leaks in the tool and repairing any leaks that may exist. Furthermore, checking the tool for leaks using the three-ply test requires the use of an autoclave at the production facility and the availability of skilled labor to lay up and cure the part. During the curing of the fiberglass part, the autoclave is unavailable for production use. In addition, the costs for material required for the three-ply test may be significant for relatively large tools.

Another method of detecting leaks in tools includes the use of a helium detector wherein a helium emitter is moved along the tool when placed under vacuum. When helium is drawn into a leak, the detector is activated in order to indicate the location of the leak. Unfortunately, the accuracy of helium detectors may be affected by certain bagging films which may have a permeability that is large enough to absorb helium. As a result, the helium detector may provide false indications during leak checking.

A further method of detecting leaks in tools comprises a vacuum drop check which is typically performed at the tool manufacturer and wherein a vacuum bag is applied to the tool for a predetermined period of time after which the vacuum is withdrawn. The vacuum pressure is then monitored to determine whether an increase in pressure within the vacuum bag exceeds a predetermined limit. If the tool passes the vacuum drop check, the tool is then sent to the production facility where the 3-ply test is performed. If the tool fails the 3-ply test, then the tool is shipped back to the tool manufacturer for repair.

One drawback associated with the vacuum drop check is that although the tool may meet vacuum integrity requirements during the initial vacuum check, leaks may develop during subsequent use of the tool to an extent that may affect the fabrication of composite parts. In addition, although the vacuum integrity test may provide a means to indicate the presence of a leak, the vacuum integrity test may lack the capability to allow for identifying the location of leaks on the tool. Another drawback associated with the vacuum drop check is that the vacuum drop check may not provide an indication as to whether the leak is in the tool, in the vacuum bag or in the seal that seals the vacuum bag to the tool.

As can be seen, there exists a need in the art for a system and method for detecting leaks in tools and vacuum bags that provides a reliable indication of the location of a leak. Furthermore, there exists a need in the art for a system and method for detecting leaks in tools and vacuum bags which is accurate and which provides a means for rapid detection of the location of leaks in the tool and/or vacuum bag without the use of complex, external leak detection equipment.

SUMMARY

Leaks or pressure gradients may be detected in a tool by installing a gas impermeable, transparent membrane or vacuum bag for drawing a vacuum on the tool. The leaks or pressure gradients may be detected by a gas permeable leak detection film or coating placed on or near the vacuum bag. The leak detection film may emit or reflect light of various wavelengths in the area of a leak or pressure gradient. Relatively rapid visual detection of air leaks in tools or vacuum bags may be facilitated by the leak detection film which may be located between the inside face of the vacuum bag and the tool.

The leak detection film may optionally be applied to the inside face of the vacuum bag or to the breather layer. The leak detection film may also comprise a separate membrane that may be placed over the breather layer prior to sealing the vacuum bag to the tool. In addition, the leak detection film may be applied as a coating such as paint to the tool. The leak detection film may include a binder incorporating gas (e.g., oxygen) sensitive materials that may react to the presence of the gas such as oxygen. The gas or oxygen sensitive material may change in appearance in response to exposure to the gas or oxygen as may be caused by a leak in the tool or vacuum bag. The change in appearance may comprise a local change in color or a change in the intensity of the luminescence of the leak detection film in the area surrounding the leak.

Leaks or pressure gradients may be detected in gas impermeable, transparent membranes used to maintain a pressure differential. The leaks or pressure gradients are detected by a gas permeable film or coating placed on or near the membrane that emits or reflects light of various wavelengths in the area of the leak or pressure gradient. Rapid visual detection of air leaks in vacuum bags, for example, may be achieved using a leak detection film placed between the inside face of the vacuum bag, and a part or composite pre-form. The leak detection film may be applied directly to the inside face of the bag, or may comprise a separate membrane that is placed over the pre-form or tool before the bag is sealed. The leak detection film includes a gas permeable binder incorporating gas sensitive materials that react to the presence of the gas. The gas sensitive material changes in appearance in response to exposure to gas caused by a leak in the bag. The change in appearance may comprise a local change in color and/or a change in the intensity of light emitted by the leak detection film in an area surrounding a leak.

According to a disclosed embodiment, a device is provided for indicating the location of an air leak in a vacuum bag used in processing parts, comprising a film including oxygen sensitive material inside of and extending across the bag, the oxygen sensitive material changing in physical appearance at the general location of an air leak in the bag. The film may include an oxygen permeable binder incorporating the oxygen sensitive material. The film may be bonded to an inside face of the bag and may be formed from a flexible polymer or paint that is applied to the bag. The oxygen sensitive material may include light sensitive nano-particles responsive to light of a predetermined wavelength for emitting light indicating the location of the air leak. The oxygen sensitive material may be excited by light of a pre-selected wavelength to luminesce. The intensity of the luminescence may change in the area of an air leak due to the presence of oxygen. A dye may be added to the film in order to color the luminescence of the film.

According to another disclosed embodiment, a vacuum bag assembly used in bonding parts together comprises a vacuum bag covering at least one of the parts and defining a space in which a vacuum may be drawn to assist in bonding the parts. The vacuum bag assembly may include a leak detection film inside of and extending across the bag. The leak detection film may include oxygen sensitive material that changes in physical appearance at the general location of an air leak in the bag.

According to a further another disclosed embodiment, a device is provided for detecting an air leak in a vacuum bag used in fabricating composite parts comprising a film inside of and substantially coextensive with the area of the bag subjected to a vacuum. The film includes an oxygen permeable binder and an oxygen sensitive material held in the binder. The oxygen sensitive material has at least one visual characteristic that changes in the presence of oxygen introduced into the vacuum bag by an air leak. The film may comprise a coating formed on the inside face of the bag. The oxygen sensitive material may include pressure sensitive luminophores.

According to a further embodiment, a vacuum molding bag is provided, comprising a flexible, substantially transparent polymer sheet having an inside face and an outside face and a film on the inside face of the polymer sheet. The film includes an oxygen permeable binder and an oxygen sensitive material held in the binder. The oxygen sensitive material exhibits a change in the physical appearance of the film in the area of an air leak in the molding bag indicating the location of the air leak. Portions of the film may be removable from the polymer sheet in order to tailor the geometry of the film relative to a seal which surrounds a part pre-form or other object to be subjected to a vacuum.

According to still another embodiment, a device is provided for use in manufacturing and industrial processes to detect gas leaks in a gas impermeable, transparent membrane. The device comprises means extending across the membrane for providing a visual indication of the location of a gas leak in the membrane. The means for providing a visual indication may include a film that changes in appearance in the area of the gas leak. The film may include a gas permeable binder, and means held in the binder for visually reacting to the presence of a gas reaching the film through the leak. The film may be attached to the membrane, and may be substantially coextensive with an area on the membrane over which leaks are to be detected. The visually reacting means includes pressure sensitive luminophores.

According to another embodiment, a device is provided for detecting gas leaks in a seal between a vacuum processing bag and a base, comprising a film inside of the processing bag and disposed adjacent the seal. The film may include a gas permeable binder and a gas sensitive material held in the binder, the gas sensitive material having at least one visual characteristic that changes in the presence of gas entering the process bag through a leak in the seal. The film may extend substantially across the seal, and between the process bag and the base.

According to a disclosed method embodiment, processing a part using a vacuum bag comprises the steps of placing the part on a base, placing a leak detection film over the part, placing a substantially transparent vacuum bag over the sheet of leak detection film and sealing the bag against air infiltration. The method may further comprise the steps of drawing vacuum in the bag and detecting an air leak in the bag by detecting the location of a change in appearance of the leak detection film resulting from air entering the bag. The method may further include the step of illuminating the bag with light having a wavelength that causes the leak detection film to luminesce so that changes in the intensity of the luminescence in the area of the air leak can be detected.

According to a further embodiment, disclosed is a method of fabricating a vacuum bag allowing detection of air leaks in the bag. The method may comprise the steps of forming a flexible polymer sheet and applying a leak detection film on one face of the polymer sheet. The film may be applied by painting, printing or bonding the film on the face of the polymer sheet. The method may further comprise fabricating the film by extruding an oxygen permeable binder. The film may be fabricated by compounding an oxygen permeable binder and an oxygen sensitive material that changes in appearance when subjected to oxygen.

According to a further method embodiment, a vacuum molding bag process may provide a means for detection of air leaks in the bag. The method may comprise the steps of forming a flexible polymer sheet and applying a leak detection film to one face of the polymer sheet. The leak detection film may be applied by painting, printing or bonding the film onto the face of the polymer sheet, or by co-extruding the film along with the polymer sheet.

According to a further method embodiment, a method of infusing a preform with resin comprises the steps of forming redundant vacuum chambers about the preform such that an inner vacuum chamber is disposed within an outer vacuum chamber and, if one of the vacuum chambers fails, the other vacuum chamber maintains vacuum integrity. The method may include evacuating the vacuum chambers such that the outer vacuum chamber has a pressure approximately equal to or greater than a pressure in the inner vacuum chamber. The method may also include placing a leak detection film inside at least one of the inner and outer vacuum chambers, infusing resin into the preform while substantially maintaining the pressures in the vacuum chambers and detecting a leak in the at least one vacuum chamber by observing changes in the visual appearance of the leak detection film at the location of the leak.

Also disclosed is a tool leak check assembly for detecting an air leak in a tool as may be used for forming composite articles. The tool leak check assembly may include a vacuum bag, a leak detection film disposed between the vacuum bag and the tool, and an oxygen sensitive material configured to change physical appearance at a location of an air leak in the tool such as in the presence of oxygen. The tool leak check assembly may further include a breather layer interposed between the tool and the vacuum bag for facilitating air flow therebetween.

In a further embodiment, the tool leak check assembly may include a substantially transparent vacuum bag and a substantially transparent leak detection film disposed along an inside face of the vacuum bag. The vacuum bag may include oxygen sensitive material that may change in intensity when illuminated by light of a preselected wavelength causing the oxygen sensitive material to luminesce. The intensity of the luminescence may change in relation to an amount of oxygen present. The tool leak check assembly may include a breather layer which may be configured as netting interposed between the tool and the leak detection film for facilitating air flow therebetween.

The netting may include a plurality of strands wherein each one of the strands may act as a spacer for spacing the vacuum bag away from the tool such that the netting forms a plurality of cells for controlled flow through the vacuum bag. The vacuum bag may be pinched against the tool within each cell such that relatively small leaks in the tool may cause an increase in pressure in the cell which may be detectable using the oxygen sensitive material.

The tool leak check assembly may further include a source of light for illuminating the leak detection film at the preselected wavelength and in a repeated pattern of cycles of predetermined duration. A camera may be used for recording images of the luminescence of the leak detection film in syncopation with the pattern of illumination of the leak detection film for comparison with camera images recorded of the rate of decay of the intensity of the luminescence of the leak detection film for correlation in proportion to an amount of oxygen in the area.

In a further embodiment, disclosed is a method of detecting a leak in a tool and/or a vacuum bag. The method may comprise the steps of applying the vacuum bag to the tool wherein the vacuum bag has a leak detection film disposed between the vacuum bag and the tool. The leak detection film may include oxygen sensitive material configured to change physical appearance in the presence of oxygen. The method may include sealing the vacuum bag to the tool, drawing a vacuum on the vacuum bag and using a camera to inspect the vacuum bag for a change in physical appearance to detect the presence of a leak in one of the tool and the vacuum bag.

Also disclosed is a method of detecting a leak in a tool and/or a vacuum bag comprising the steps of applying the vacuum bag to the tool wherein the vacuum bag has a leak detection film disposed between the vacuum bag and the tool. The leak detection film may include oxygen sensitive material configured to change physical appearance in the presence of oxygen. The method may include sealing the vacuum bag to the tool, drawing a vacuum on the vacuum bag and inspecting the vacuum bag for a change in physical appearance to detect the presence of a leak in one of the tool and the vacuum bag.

In a further embodiment, the method may comprise identifying the location of an air leak in a tool for forming composite parts. The method may comprise the steps of applying a substantially transparent vacuum bag to the tool wherein the vacuum bag has a substantially transparent leak detection film disposed at a thickness along an inside face of the vacuum bag and including oxygen sensitive material changing in intensity when illuminated by light of a preselected wavelength. The method may further comprise sealing the vacuum bag to the tool and drawing a vacuum on the vacuum bag. The vacuum bag may be illuminated at a preselected wavelength in a repeated pattern of cycles of predetermined duration to cause the leak detection film to luminesce.

The embodiment may include the use of a camera to record a set of images of the luminescence of the leak detection film in syncopation with the pattern of illumination. The method may further comprise summing the images recorded in syncopation with the illumination to produce a reference image of the leak detection film. In addition, the method may further include recording images of the rate of decay of the intensity of the luminescence of the leak detection film in reverse syncopation to the pattern of illumination thereof and summing the images recorded in reverse syncopation with the illumination to produce a run image of the leak detection film. The reference image may be divided by the run image to cancel out variations in the illumination of the leak detection film and in the thickness of the leak detection film at different areas of the vacuum bag. The rate of decay of the intensity of the luminescence of an area of the leak detection film may be correlated in proportion to the amount of oxygen in the area in order to detect an air leak.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 8 is a plan illustration of an edge of the vacuum bag showing the area where the leak detection film may be removed;

FIG. 9 is a plan illustration of a section of an alternate embodiment of the leak detection film in which a grid of pre-formed lines of weakness are formed in the film;

FIG. 10 is a functional block diagram similar to FIG. 1 and showing an embodiment used to detect leaks in a process employing double vacuum bags;

DETAILED DESCRIPTION

Figure 1:
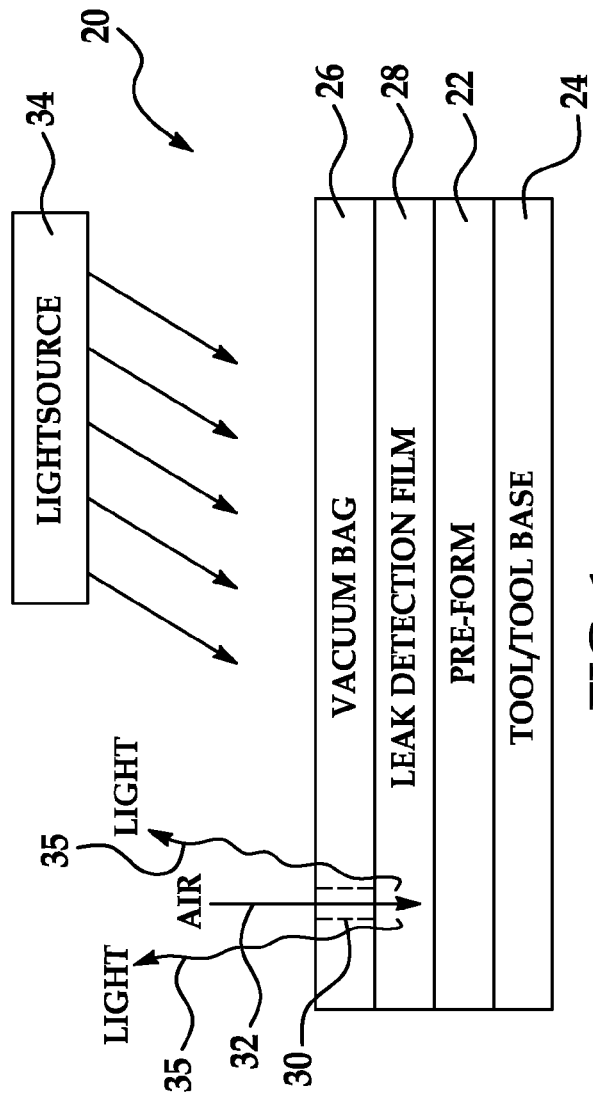
FIG. 1 is a functional block diagram illustrating a leak detection system for vacuum bags.
Figure 2:
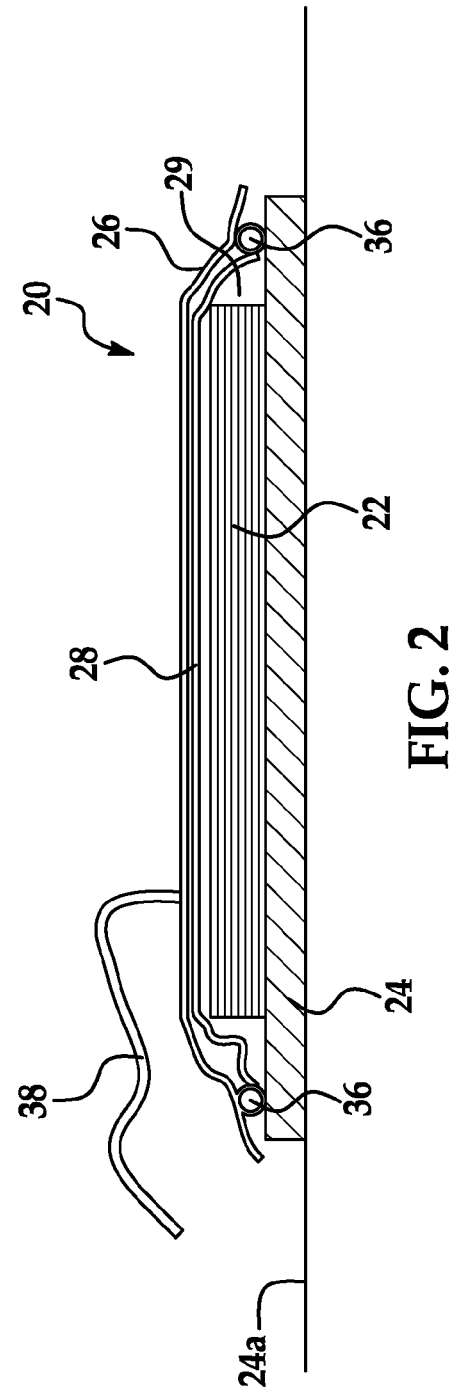
FIG. 2 is a cross sectional illustration of a molding assembly using a leak detection film.
Figure 3:
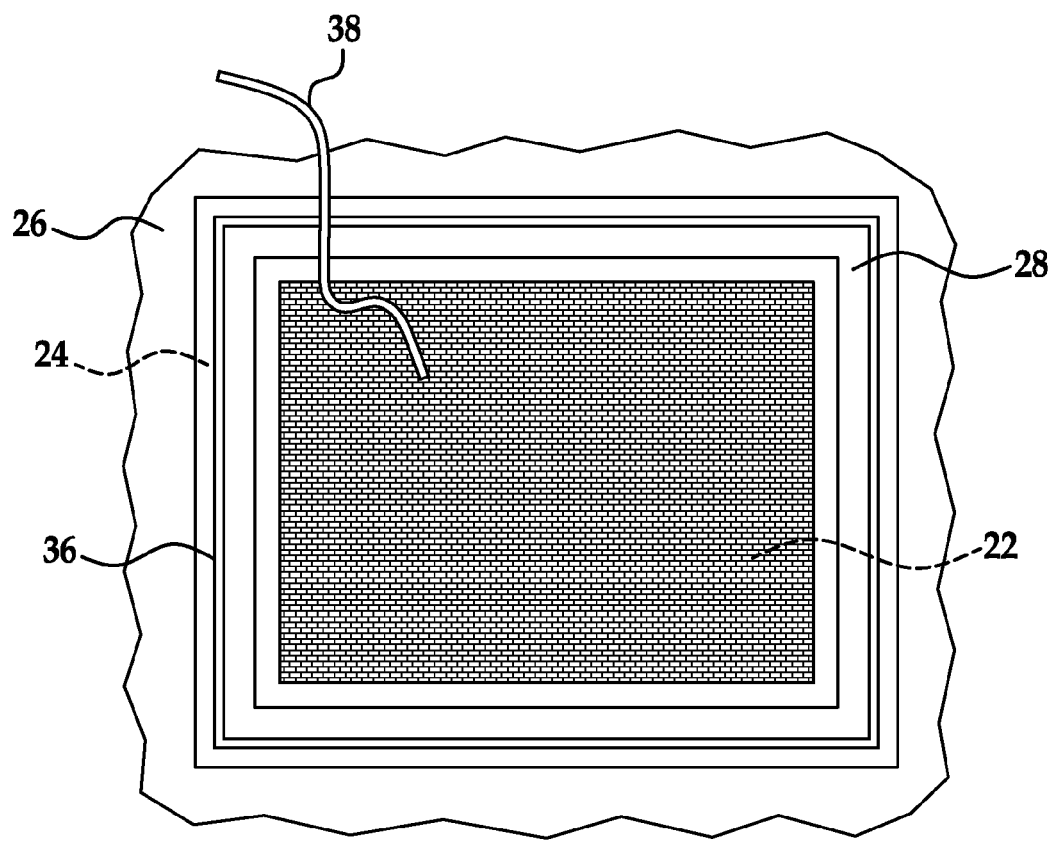
FIG. 3 is a plan view illustration of the assembly shown in FIG. 2.

Referring first to FIG. 1, a vacuum bag composite part molding assembly 20 may be used to perform vacuum bag molding, vacuum assisted bonding of two parts together, often of dissimilar materials, vacuum assisted resin transfer molding or a variety of operation wherein the application of vacuum pressure is required. A part pre-form 22 is placed on a molding tool 24 and tool base 24. A heat shield tile or rubber pad or other material suitable for bonding may be used in certain applications instead of the pre-form 22. A support surface onto which a heat shield tile, rubber pad or other material suitable for bonding may be used in certain applications instead of the molding tool 24 and tooling base. A layer of leak detection film (LDF) 28 may be either placed over the pre-form 22 or bonded/formed on the inside face of a vacuum bag 26.

As used herein, "LDF" refers to a layer of material that includes a binder or matrix incorporating a gas sensitive material which may be in molecular form. The layer may be in the form of a film, coating or a membrane. The vacuum bag 26 is placed over the pre-form 22 and sealed around its edges. A vacuum is drawn within vacuum bag 26 in order to compact the pre-form 22 and/or draw resin from a source (not shown) into the vacuum bag 26, which is then infused into the pre-form 22. An air leak 30 in the vacuum bag 26 may result in air 32 entering the evacuated space within the vacuum bag 26. The air 32 exposes the LDF 28 to oxygen at the location of the air leak 30.

As will be discussed in more detail below, the LDF 28 includes an oxygen sensitive material that reacts to oxygen in the incoming air 32 by changing its physical appearance, which is emitted or reflected from the LDF 28 as light 35. This change occurs generally only in the area of the air leak 30. Since the vacuum bag 26 may be substantially transparent, operating personnel may detect the location of the leak 30 by observing the changes in appearance of the LDF 28 around the area of the leak 30. The change in appearance of the LDF 28 may comprise, without limitation, a change in the color of the film 28 surrounding the air leak 30 or a change in the intensity of the luminescence of the LDF 28 around the leak 30.

For example, LDF 28 may react to an atmospheric gas (oxygen) by changing color (e.g., growing darker or lighter) or changing in intensity of light emitted by the LDF 28. This reaction may be temporary so that the vacuum bag 26 may appear as red, when it is exposed to the air before it is used. Then, the vacuum bag 26 may change to a different color or the intensity of light emitted by the LDF 28 may change when the vacuum bag 26 is evacuated. In the event of a vacuum bag leak, the area around the leak will remain red, enabling an operator to quickly detect and repair the leak. Alternatively the LDF 28 may contain, without limitation, a phosphorescent that emits different wavelengths of light 35 near a leak, or that change in the intensity of the light around a leak.

Depending upon the materials used, the LDF 28 may be exposed to a light source 34 which directs light of a particular wavelength, such as UV, onto the film 28. The incident light causes the oxygen sensitive material around the area of the leak 30 to luminesce (light 35), which may include either florescence or phosphorescence. The LDF 28 may include, for example, without limitation, so-called "pressure sensitive paints" which change in intensity of the light that is emitted based upon the oxygen partial pressure near the paint. The paint may comprise luminophore molecules suspended in an oxygen permeable binder that are excited by light of a particular wavelength (e.g. blue), and then return to the ground state by emitting light of a different wavelength if oxygen is present. The presence of oxygen causes the luminophore molecules to return to their ground state through oxygen-quenching. The intensity of the light that is emitted may vary in proportion to the surrounding partial pressure of the oxygen.

It should be noted here that the use of the LDF to detect leaks in vacuum bags and tooling is merely illustrative of a wide range of applications of the LDF in industrial and manufacturing processes where it is desired to detect leaks or pressure gradients such as in gas impermeable, transparent membranes used to maintain a pressure differential. While the disclosed embodiments of the LDF employ materials that react to the presence of oxygen contained in the air, in order to detect leaks in vacuum bags, the LDFs may be used to detect the presence of various other gases, depending on the application. It should be further noted that the change in appearance of the LDF may occur as the result of changes in light reflected from the surface of the LDF, changes in the emission of light from the LDF triggered by incident light of particular wavelengths or even by chemical reactions resulting from the exposure of the LDF to a particular gas.

Attention is now directed to FIGS. 2-5 which disclose further details of the composite part molding assembly 20. The pre-form 22 is placed on a tool 24 supported on a tool base 24a. In the illustrated embodiment, a membrane-like LDF is placed over the pre-form 22 and tool 24. A conventional vacuum bag 26 is spread over the LDF 28 so that the inside face of the vacuum bag 26 is in close proximity to or contacts the LDF 28. In order that leaks may be detected over the entire area of the vacuum bag 26 in which a vacuum is drawn, the outer margins of the LDF 28 may extend out to the edge of a seal 36, so that the LDF 28 is substantially coextensive with the evacuated area of the vacuum bag 26.

The outer margins of the vacuum bag 26 are attached to the seal 36 that forms an air tight boundary to tool 24 around the perimeter of the vacuum bag 26. Sealed vacuum bag 26 encloses a volume 29 between vacuum bag 26 and tool 24 which is supported on tool base 24a. One or more vacuum lines 38 may connect to the vacuum bag 26 in order to connect vacuum bag 26 to a vacuum source to evacuate the vacuum bag 26. In the case of a VARTM process, additional lines (not shown) may be used to connect the vacuum bag 26 with a source of resin (not shown) that is drawn into the vacuum bag 26 by the vacuum.

Figure 4:
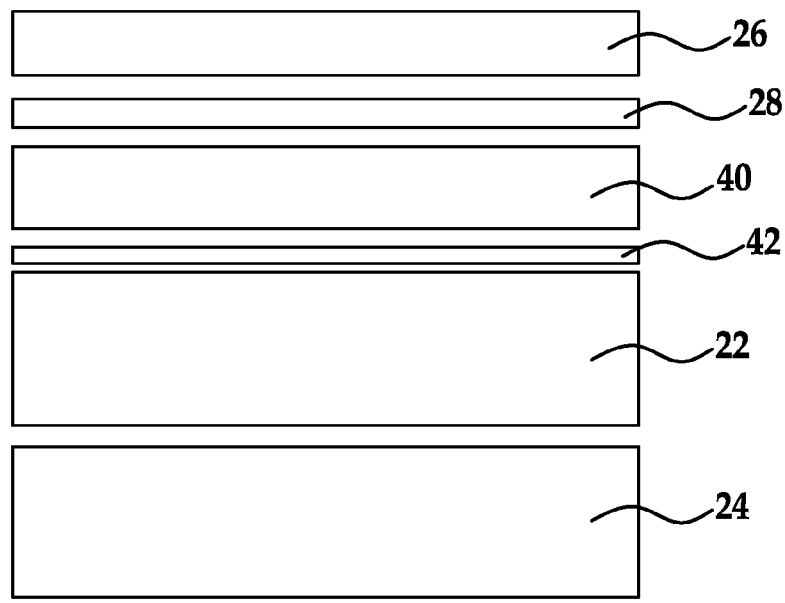
FIG. 4 is an exploded illustration of the components of a vacuum molding assembly including one embodiment of the leak detection film.

As best seen in FIG. 4, the vacuum bag 26 may comprise a flexible polymer film, such as Nylon®, Kapton® or PVA (polyvinyl alcohol) that is substantially transparent and impermeable to gasses. The LDF 28 comprises a gas permeable binder incorporating oxygen sensitive material such as luminophores or other similar materials that may be triggered to emit radiation as a reaction to the presence of oxygen. The oxygen sensitive material may also comprise, for example, light sensitive nano-particles that detects the presence of oxygen only when they are "switched on" by light of a particular wavelength, such as ultraviolet (UV) light. The pre-form 22 may be covered by a release ply 42 and a breather layer 40 used in those applications where the pre-form 22 is composed of prepreg. In the case of a dry pre-form 22 that is to be infused by resin, layer 40 may comprise flow media, rather than a breather. As will be discussed later in more detail, the LDF 28 may comprise a plastic or other binder material used to hold the oxygen sensitive materials. The LDF 28 may be cast, extruded or fabricated by other conventional fabrication processes.

Figure 5:
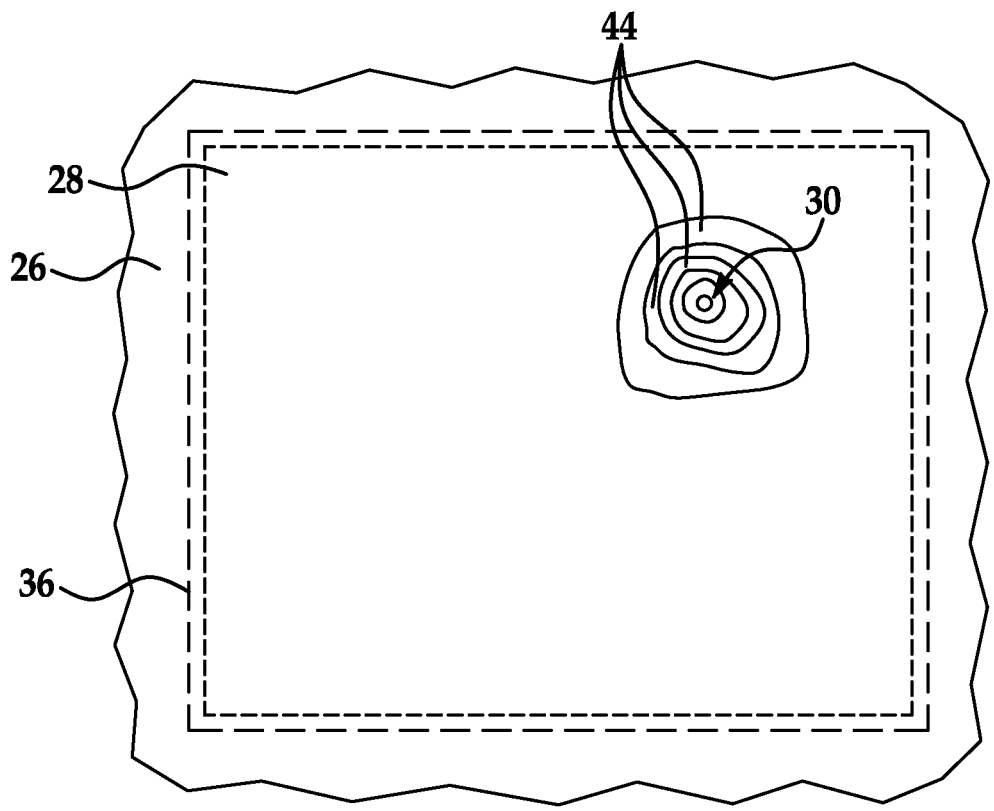
FIG. 5 is a plan view illustration of a vacuum bag and leak detection film showing the location of an air leak in the vacuum bag.

As previously described, depending upon the materials used as the oxygen sensitive material in the LDF 28, a leak 30 in the vacuum bag 26 allows air to enter the vacuum bag 26 which exposes the LDF 28 to oxygen in the area surrounding the leak 30. The oxygen sensitive material reacts to the presence of the entering air by changing the intensity of light emitted thereby. Other physical changes in the LDF 28 that may be visually detectable may be possible, depending upon the materials used. The degree of change in the physical appearance (color or light intensity) may depend upon the pressure of the air (and thus the oxygen) entering the leak 30. Generally, the change in physical appearance of the LDF 28 around the air leak 30 will diminish with increasing distance from the air leak 30. Thus, as shown in FIG. 5, the change in physical appearance of the LDF 28 may take the form of color bands 44 or light intensity bands having different intensities of light surrounding the air leak 30.

As previously described, the leak detecting film 28 may comprise materials similar to known materials referred to as pressure sensitive paints which comprise two primary parts: an oxygen-sensitive florescent molecule and an oxygen-permeable binder. The detection process is based on the sensitivity of the luminescent molecules to the presence of oxygen. When a luminescent molecule absorbs a photon, it is excited to an upper singlet energy state. The molecule then typically recovers to the ground state by the admission of a photon of a longer wavelength.

In some materials, oxygen can interact with the molecules such that the transition to the ground state is without radiation—a process known as oxygen quenching. The rate at which these two processes compete may depend upon the partial pressure of the oxygen present with a higher oxygen pressure quenching the molecule to a greater extent, thus diminishing the intensity of the light. It should also be noted here that the luminescence intensity of the LDF 28 at a given point may also be a function of other factors. For example, the luminescence intensity may depend on variations in the spatial distribution of the illumination over the LDF 28, the level of concentration of the luminospheres, the thickness of the LDF 28 and the sensitivity of any cameras that may be used to detect visual changes in the LDF 28.

Examples of materials that may be implemented in the LDF include, but are not limited to, polycyclic aromatic hydrocarbons such as, without limitation, pyrene and pyrene derivatives, transition metal complexes including ruthenium, osmium, and iridium compounds such as, without limitation, ruthenium tris-bathophenanthroline chloride, and metalloporphyrins which include platinum and palladium compounds such as, without limitation, platinum flourophenyl porphyrin (PtTFPP) and platinum octaethylporphyrin (PtOEP). In this regard, materials from which the LDF may be formed may include any suitable oxygen-quenched luminophore or any other suitable compound that changes in physical appearance in the presence of oxygen. Depending upon the particular materials used in the LDF, specialized recording instruments may not be necessary in order to detect luminescent emissions produced by the oxygen sensitive molecules. For example, by doping the materials in the film with adequate substances, a luminescence emission in the visible range may be obtained which may be oxygen sensitive.

Figure 6:
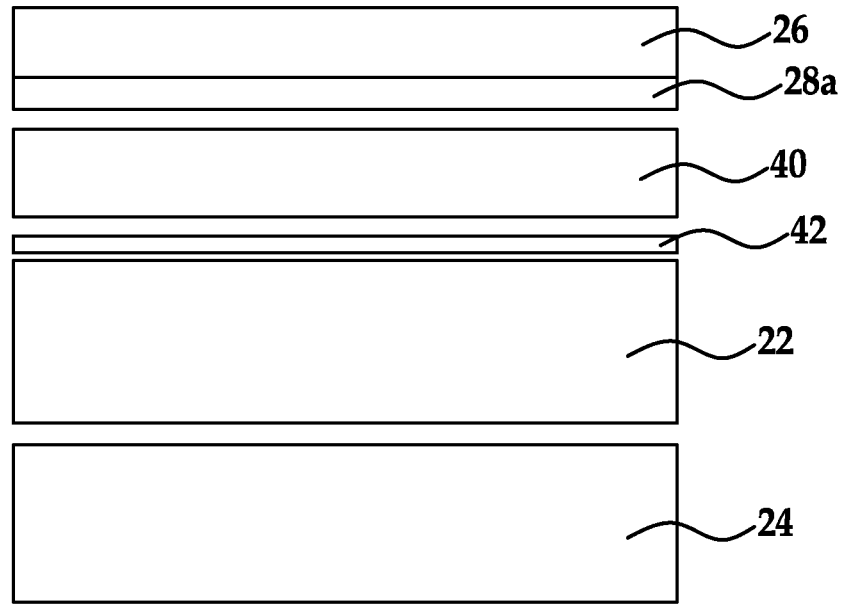
FIG. 6 is a sectional illustration similar to FIG. 4 and showing an alternative form of the film applied to the vacuum bag.
Figure 7:
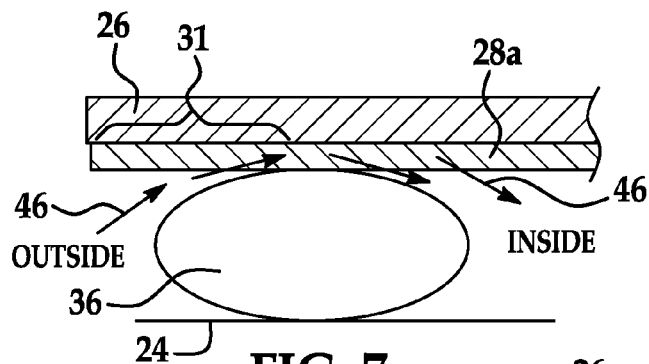
FIGS. 7 and 7a are sectional illustrations useful in explaining the removal of portions of the film extending beyond the vacuum seal.
Figure 7A:
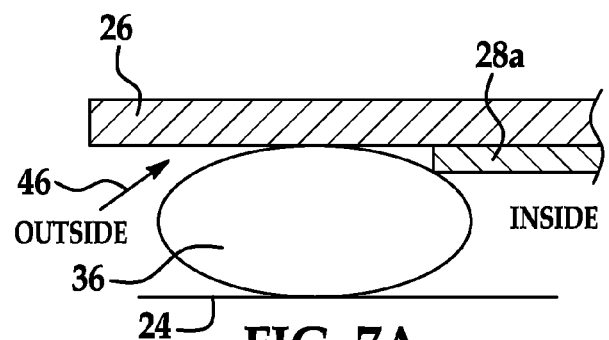
Figure 7B:
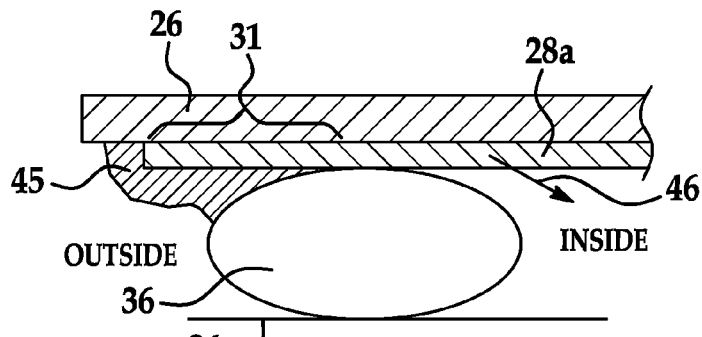
FIG. 7b is a sectional illustration of an alternate embodiment in which the edge of the leak detection film is covered by a protective coating.

FIG. 6 illustrates an arrangement in which another embodiment of the LDF 28a is adhered to the inside face of the vacuum bag 26. As will be discussed below, the LDF 28a may comprise a separate sheet of material that is bonded to the vacuum bag 26 sheet. Alternatively, the vacuum bag 26 and LDF 28a may be co-extruded so as to form a double layer, single sheet of material. Further, the LDF 28a may comprise a paint or ink that is sprayed or printed onto the vacuum bag 26. Where the LDF 28a is in the form of a paint or ink, it should have sufficient flexibility to generally match the flexibility of the vacuum bag 26. It may also be desirable to generally match the coefficients of thermal expansion (CTE) of the vacuum bag 26 and the LDF 28a.

Where the LDF 28a is adhered directly to the inside face of the vacuum bag 26, it may be important to assure that the LDF 28a does not extend beyond the seal 36. For example, as shown in FIG. 7, allowing the LDF 28a to extend beyond the seal 36 may expose a portion 31 of the LDF 28a to outside air 46 which may then enter the LDF 28a, pass through the plane of the LDF 28a and may be released inside the vacuum bag 26. Accordingly, the LDF 28a may optionally be truncated inside of the seal 36, as illustrated in FIG. 7a, but preferably as close to the seal 36 as possible. Alternatively, as illustrated in FIG. 7b, it may be possible to apply a gas impervious coating 45 over any portions 31 of the LDF 28a that extend beyond the seal 36 in order to prevent air from entering the vacuum bag 26 through the edges of the LDF 28a. Furthermore, the LDF may be relatively thin such that applying the LDF-coated vacuum bag 26 to the seal may result in an insignificant amount of air leaking into the vacuum bag. In an embodiment, the LDF may be co-extruded with the vacuum bag such that the LDF has a thickness of approximately 0.00025 inch or less to minimize leaking across the seal.

Figure 7C:
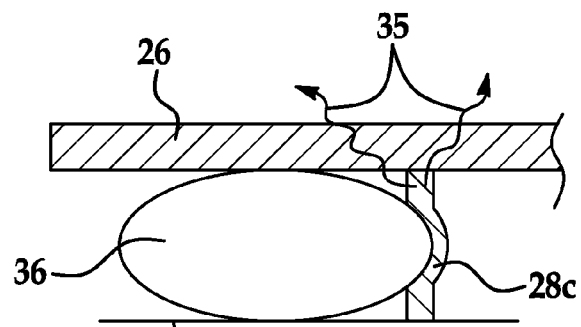
FIG. 7c is a sectional illustration of an alternate embodiment in which a leak detection film is positioned to detect leaks in a bag seal.

FIG. 7c illustrates an alternate embodiment in which a short length of LDF 28 is positioned between the vacuum bag 26 and the tool 24, immediately adjacent the vacuum bag seal 36. Positioning LDF 28 across the seal 36 allows an operator to detect leaks in the seal 36, since a leak in the seal 36 may be detected by the LDF 28 which will emit light 35 near the edge of the seal 36. The LDF 28 may be used with or without a separate LDF 28 employed to detect leaks in the vacuum bag 26. The oxygen sensitive material used in the LDF 28 may produce light emitted at different intensities by the LDF 28 for detecting leaks in the vacuum bag 26, thus allowing an operator to distinguish between leaks in the seal 36 and leaks in the vacuum bag 26. It should be noted here that the LDF 28 need not be sealed against either the vacuum bag 26 or the tool 24.

Figure 7D:
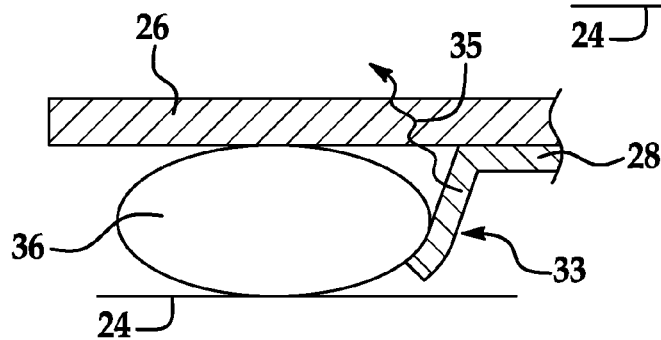
FIG. 7d is a sectional illustration of an alternate embodiment in which an edge of the leak detection film is positioned to detect leaks in a bag seal.

FIG. 7d illustrates an alternate embodiment which may allow detection of leaks in the seal 36. The edge 33 of an LDF 28 extends from the inner surface of the vacuum bag 26 adjacent the seal 36, downwardly to the tool 24, thereby effectively covering the edge of the seal 36. The edge 33 need not be sealed to the tool 24. A leak in the seal 36 may result in light 35 being emitted or reflected from the LDF 28 near the seal 36, thereby alerting an operator that a leak may be present in or near the seal 36.

FIG. 8 illustrates a marginal area 48 of the vacuum bag 26 in which a portion of the LDF 28a is removed. Where the film 28a is painted or printed onto the surface of the vacuum bag 26, chemicals or etchants may be used to remove the LDF 28a in the marginal areas 48. For example, where the LDF 28 is an acrylic paint, portions of it may be removed from the vacuum bag 26 using acetone. Also, areas of the vacuum bag 26 may be masked off during the painting or printing process to define the outer boundaries of the LDF 28.

Where the LDF 28a is co-extruded with the vacuum bag 26 or is bonded to the vacuum bag 26, it may be possible to cut away and remove the marginal portions 48 of the LDF 28a.

FIG. 9 illustrates an arrangement for removing the marginal portions 48 of the LDF 28. During manufacture of the LDF 28a, preformed lines of weakness 52 may be produced in the film 28a, in the form of a grid pattern. The preformed lines of weakness 52 allow an operator to remove the marginal portions by simply tearing them away from the vacuum bag 26 along the gridlines. Similarly, strips on the vacuum bag 26 forming a grid pattern may be left uncoated by the LDF 28 to allow a technician to seal the vacuum bag 26 along any of the strips.

The LDF 28 may be employed to detect leaks in multiple vacuum bags or vacuum bag assemblies. For example, a double vacuum bag assembly 20a is show in FIG. 10 which uses a pair of vacuum bags 26, 26a. Vacuum bag 26 forms an air tight cover over the pre-form 22, similar to the arrangement shown in FIG. 2. The second vacuum bag 26a forms an air tight cover over the first vacuum bag 26 so that the entire area of the first vacuum bag 26 is contained with a vacuum chamber defined by the volume within the second vacuum bag 26a. The second vacuum bag 26a forms redundancy that assures that a vacuum is maintained over the pre-form 22 in the event of an air leak 30 in the first vacuum bag 26. The second vacuum bag 26a may also function to equalize the pressure applied over the area of the first vacuum bag 26, so that resin is more evenly infused into the pre-form 22. LDFs 28, 28b are positioned inside the vacuum bags 26, 26a respectively to detect vacuum bag leaks.

Figure 11:
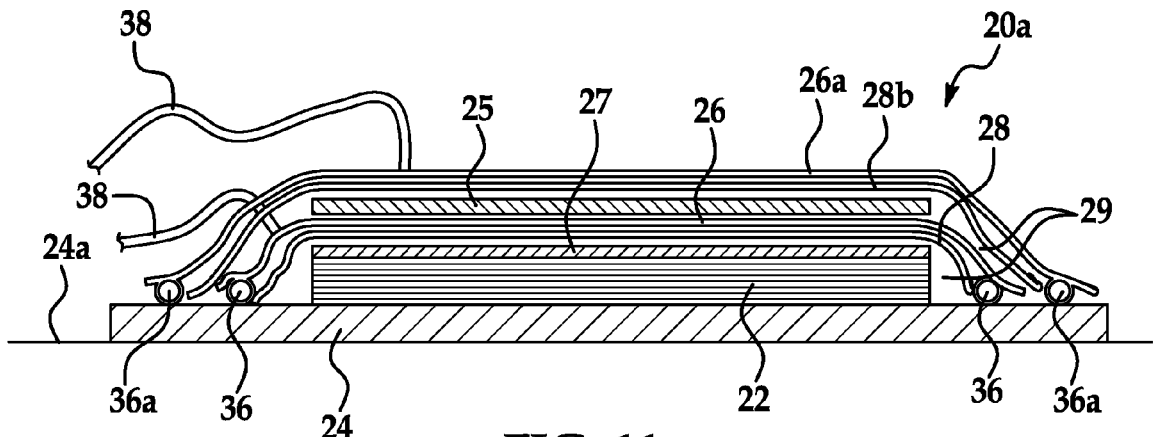
FIG. 11 is a cross sectional illustration similar to FIG. 2 1 and showing an embodiment used to detect leaks in a process employing double vacuum bags.

FIG. 11 illustrates details of a double vacuum bag VARTM molding assembly 20a. Flow control media 27 is positioned over the pre-form 22, and the first LDF 28 is positioned between the flow control media 27 and the inner vacuum bag 26, which is sealed to the tool 24 by an inner seal 36. The second LDF 28b is placed between the inner vacuum bag 26 and the outer second vacuum bag 26a which is sealed to the tool 24 by an outer seal 36a and is coupled to a vacuum line 38. The LDF 28 detects leaks in the inner vacuum bag 26, while LDF 28b independently detects leaks in the outer second vacuum bag 26a. Alternatively, only one of the vacuum bags 26, 26a may be provided with an LDF 28, 28b. An optional breather 25 may be placed between the LDF 28b and the inner vacuum bag 26. Both the breather 25 and the LDF 28b may be substantially transparent so that an operator may observe changes in the appearance of the LDF 28 caused by a leak in the inner vacuum bag 26. The oxygen sensitive materials used in the LDF 28, 28b may be different or may be doped to produce different colors and/or different light intensities so that an observer can distinguish between leaks in the inner vacuum bag 26 and leaks in the outer vacuum bag 26a.

Figure 12:
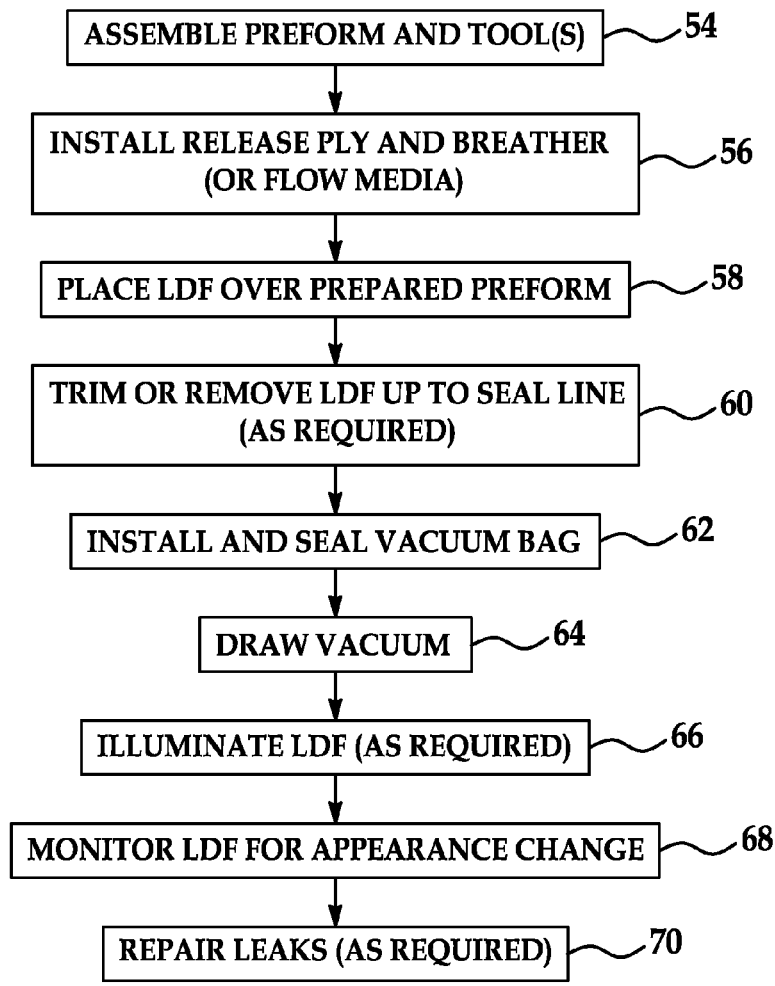
FIG. 12 is a flow diagram illustrating steps for molding composite parts using the leak detection film.

Attention is now directed to FIG. 12 which illustrates the steps of a method for performing vacuum bag molding using the leak detection system described above. Beginning at step 54, the pre-form 22 and tool 24 are assembled, following which a release ply 42 and a breather 25 or flow media are placed over the pre-form 22, as shown at step 56. Next, the LDF 28 is placed over the prepared pre-form 22. Then, at step 60, the LDF 28 is trimmed or removed up to the edge of the seal 36, as may be required. At step 62, the vacuum bag 26 is installed over the pre-form 22 and the LDF 28, and then sealed. Next, at step 64 a vacuum is drawn and the LDF 28 may be illuminated at step 66 with a light source having a wavelength that triggers luminescent emissions from the oxygen sensitive molecules in the LDF 28. At step 68, the LDF is monitored for changes in appearance, such as changes in intensity of light emitted by the LDF or changes in color in the area surrounding air leaks. Finally, at step 70, air leaks in the vacuum bag are repaired.

Figure 13:
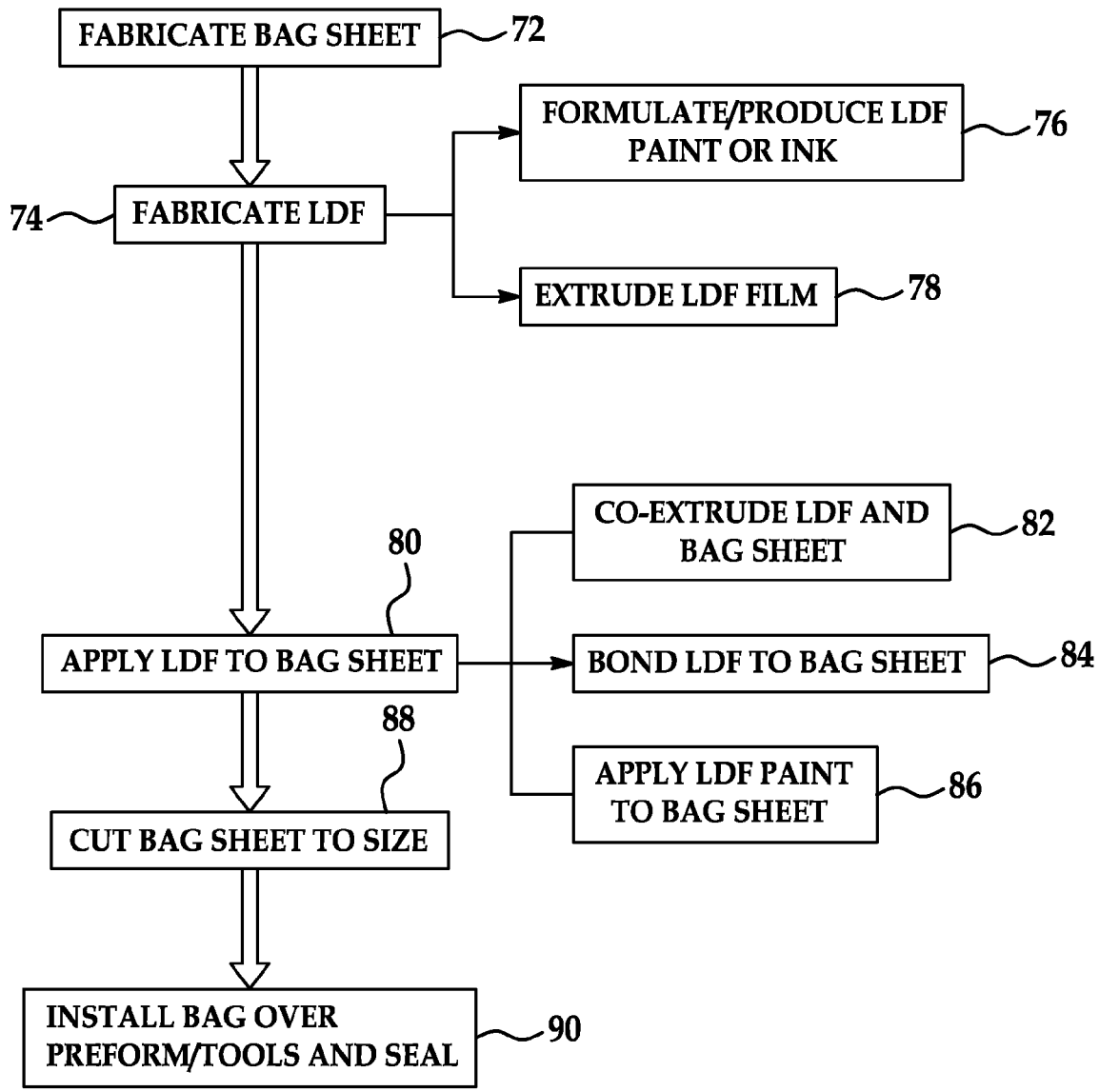
FIG. 13 is a flow diagram illustrating the steps of forming the bag and the leak detection film.

FIG. 13 illustrates the steps of alternate processes for producing the LDF 28 for vacuum bags 26. Beginning at step 72, a vacuum bag 26 is fabricated using sheets of polymer material, such as Nylon®. Next, the LDF 28 is fabricated as shown at step 74. This fabrication step may involve formulating and producing LDF paint or ink at step 76, or extruding the film, as shown at step 78.

Next, at step 80, the LDF 28 may be applied to the vacuum bag 26 by any of several processes. First, the LDF 28 may be coextruded with the vacuum bag, as shown at step 82. Alternatively, the LDF 28 may be bonded directly to the vacuum bag 26 as shown at step 84. Finally, the LDF 28 may be applied to the vacuum bag 26 either by painting or printing as shown at step 86. The vacuum bag 26 having the LDF 28 applied thereto is cut to size at step 88 and then installed over the pre-form 22 and tool 24, and sealed at step 90.

Figure 14:
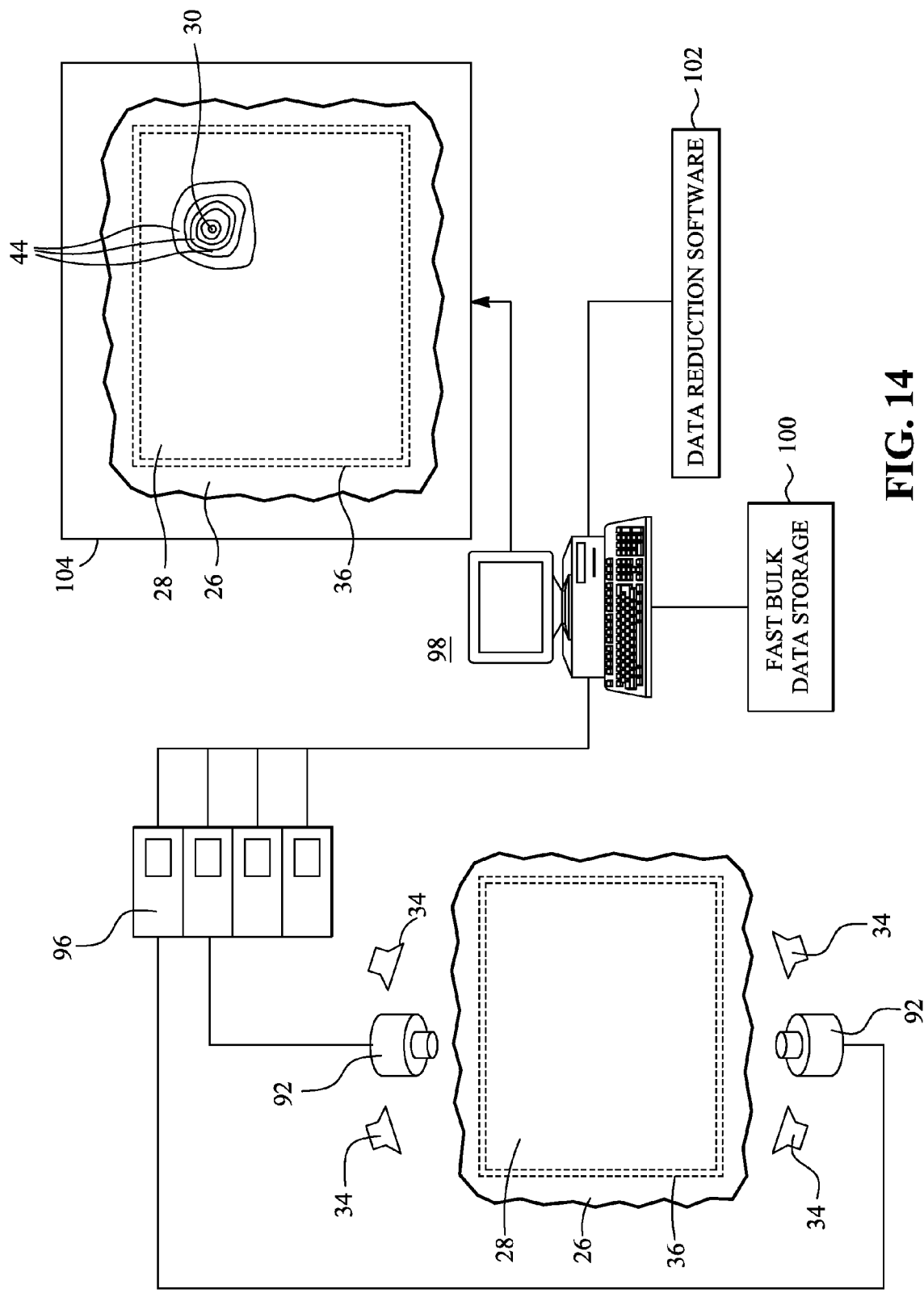
FIG. 14 is a diagrammatic illustration of a system for detecting leaks in vacuum bags and/or tools.

Attention is now directed to FIG. 14 which depicts a system that may be used for detecting air leaks in vacuum bags. Multiple excitation light source 34 direct light of a predefined wavelength, over to the surface of the vacuum bag 26. In one embodiment, the light source 34 may emit light having a wavelength of 450 nm (blue) or any other suitable wavelength. The light source 34 may include suitable filters if needed and may operate continuously or as strobes. CCD cameras 92 with suitable filters as appropriate view the surface of the vacuum bag 26. Signals from the cameras 92 are fed to camera drivers 96 which deliver recorded camera information to a PC-based work station 98. The work station 98 may include fast bulk data storage 100 and commercially available, data reduction software 102. The work station 98 may be used to display an image 104 representing images recorded by cameras 92. As can be seen in FIG. 14, image 104 reveals a pin hole air leak 30 in the vacuum bag 26 which is highlighted by contrasting colors 44 which may represent light of different intensities surrounding the leak 30.

Figure 15:
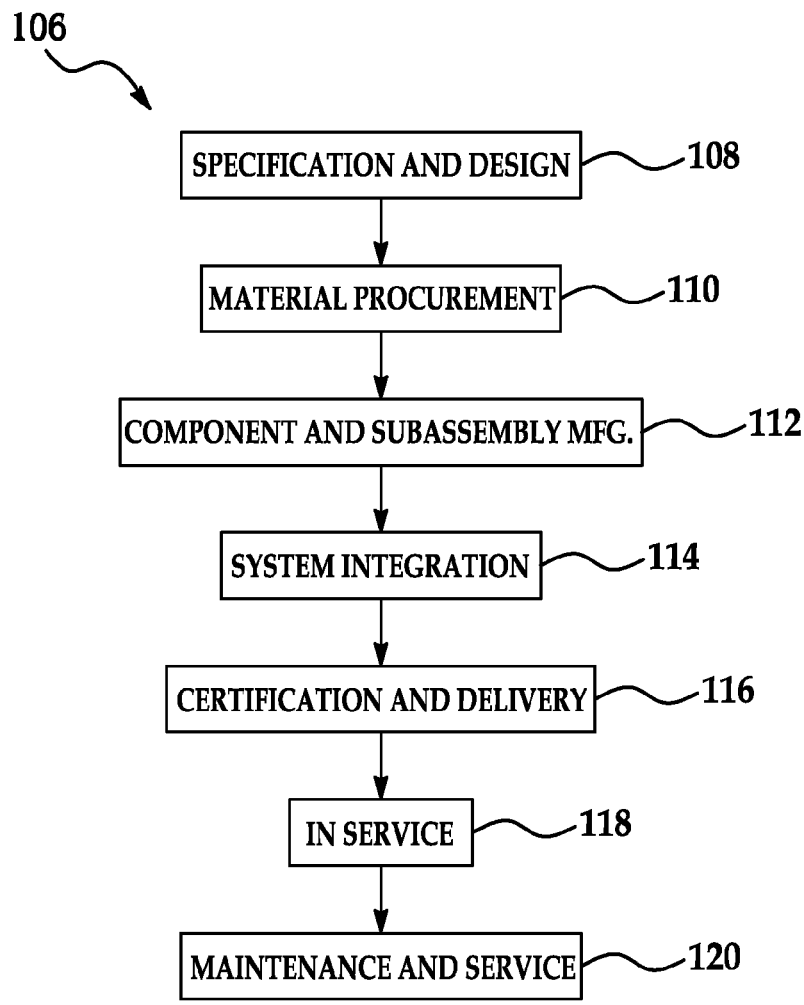
FIG. 15 is a flow diagram of aircraft production and service methodology.
Figure 16:
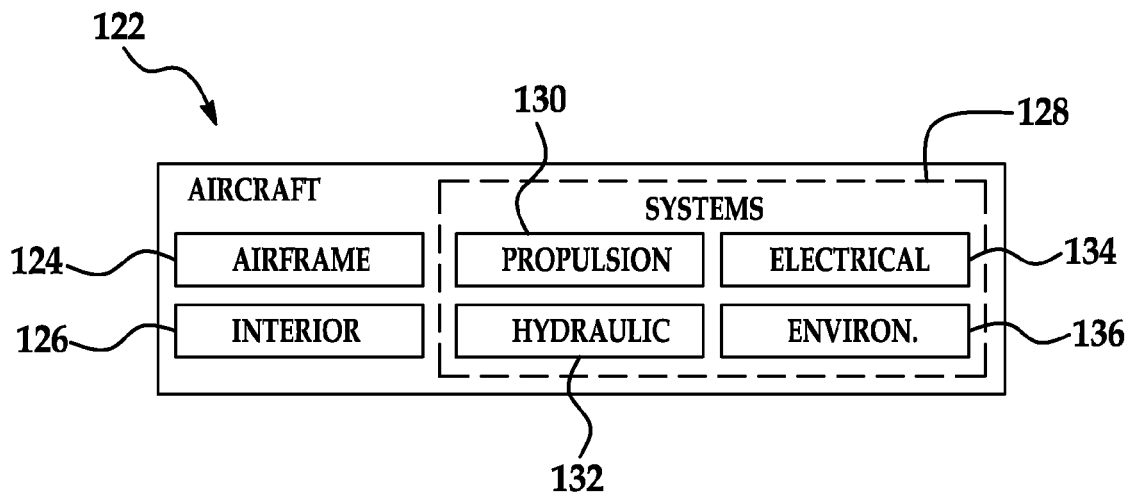
FIG. 16 is a block diagram of an aircraft.

Referring now to FIGS. 15 and 16, embodiments of the disclosure may be used in the context of an aircraft manufacturing and service method 106 as shown in FIG. 15 and an aircraft 122 as shown in FIG. 16. During pre-production, exemplary method 106 may include specification and design 108 of the aircraft 122 and material procurement 110. During production, component and subassembly manufacturing 112 and system integration 114 of the aircraft 122 takes place. Thereafter, the aircraft 122 may go through certification and delivery 116 in order to be placed in service 118. While in service by a customer, the aircraft 122 is scheduled for routine maintenance and service 120 (which may also include modification, reconfiguration, refurbishment, and so on).

Each of the processes of method 106 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 16, the aircraft 122 produced by exemplary method 106 may include an airframe 124 with a plurality of systems 128 and an interior 126. Examples of high-level systems 128 include one or more of a propulsion system 130, an electrical system 134, a hydraulic system 132, and an environmental system 136. Any number of other systems may be included. Although an aerospace example is shown, the principles of the disclosed embodiments may be applied to other industries, such as the automotive industry.

The apparatus embodied herein may be employed during any one or more of the stages of the production and service method 106. For example, components or subassemblies corresponding to production process 112 may be fabricated or manufactured in a manner similar to components or subassemblies produced while the aircraft 122 is in service. Also, one or more apparatus embodiments may be utilized during the production stages 112 and 114, for example, by substantially expediting assembly of or reducing the cost of an aircraft 122. Similarly, one or more apparatus embodiments may be utilized while the aircraft 122 is in service, for example and without limitation, to maintenance and service 120.

Figure 17:
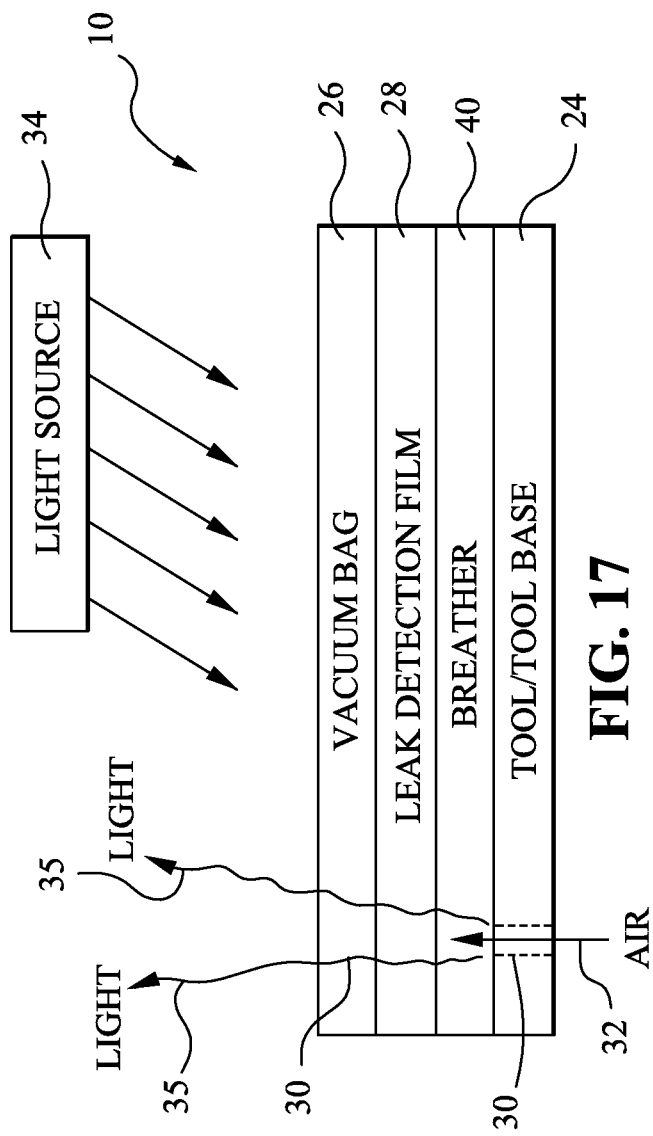
FIG. 17 is a functional block diagram illustrating a tool leak check assembly mounted to a tool.

Referring now to FIG. 17, shown is a tool leak check assembly 10 as may be used to perform a leak check on a tool 24. The tool 24 may be used to form composite parts as described above or may be used for a variety of alternative purposes. The tool leak check assembly 10 may use the LDF 28, 28a as described above with reference to FIGS. 1-13 and additional embodiments of the LDF 28, 28a as described in greater detail below. The tool leak check assembly 10 may be used to perform a leak check on a variety of different articles in a variety of applications, without limitation, and is not limited to performing a leak check on a tool as may be used in composites manufacturing. For example, the LDF may be applied to any substantially non-permeable surface to detect and locate leaks through a surface including, but not limited to, leaks in pipes, pressure vessels and any other surface. In this regard, the LDF may be applied directly to any surface such as by painting on a surface of a weld area or weld seam of a tool. A vacuum bag may then be applied to the area with or without a breather layer following by application of a vacuum to determine the existence and/or location of a leak as described in greater detail below with regard to FIG. 25.

Figure 18:
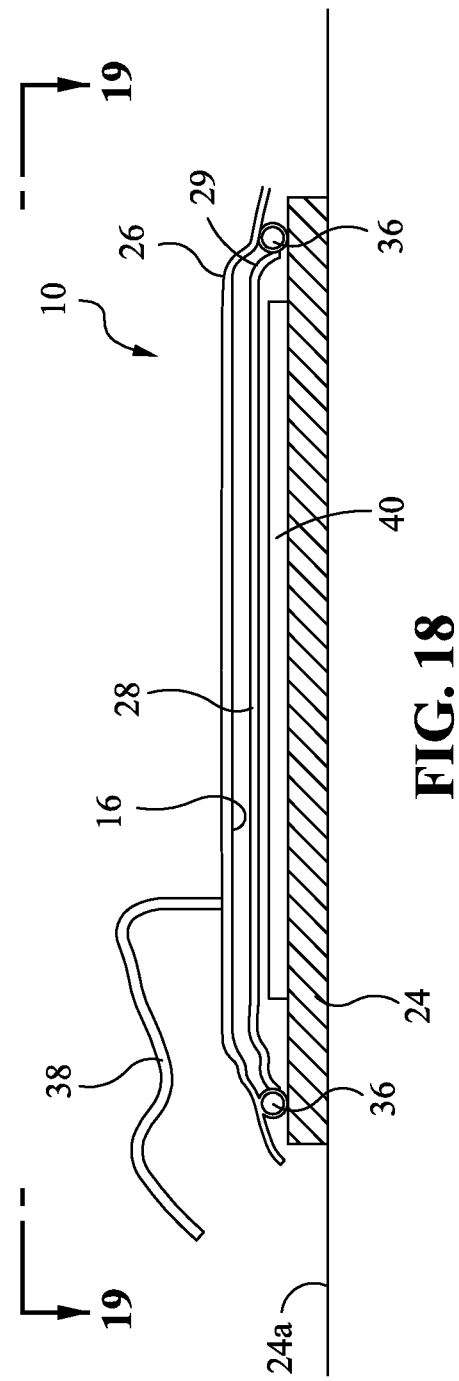
FIG. 18 is a cross sectional illustration of the tool leak check assembly.

Referring to FIG. 18, the tool leak check assembly 10 may comprise a vacuum bag assembly 12 which may include the vacuum bag 26 and a breather layer 40. The breather layer 40 may be interposed between the tool 24 and the LDF 28 for facilitating air flow therebetween when a vacuum is drawn on the vacuum bag 26. The breather layer may be formed of any suitable structure, mechanism or material of any size, shape and configuration, without limitation, and which facilitates the uniform application of vacuum across the area of the tool enveloped by the vacuum bag when a vacuum is drawn. The breather layer may comprise any porous or loosely woven material such as woven fiberglass cloth. In an embodiment, the breather layer may be integrated into the vacuum bag as a layer of breather material formed on one side of the vacuum bag. Regardless of the embodiment, the breather layer is preferably configured to facilitate the flow of gas or air between the vacuum bag and the tool when a vacuum is drawn on the vacuum bag.

Figure 19:
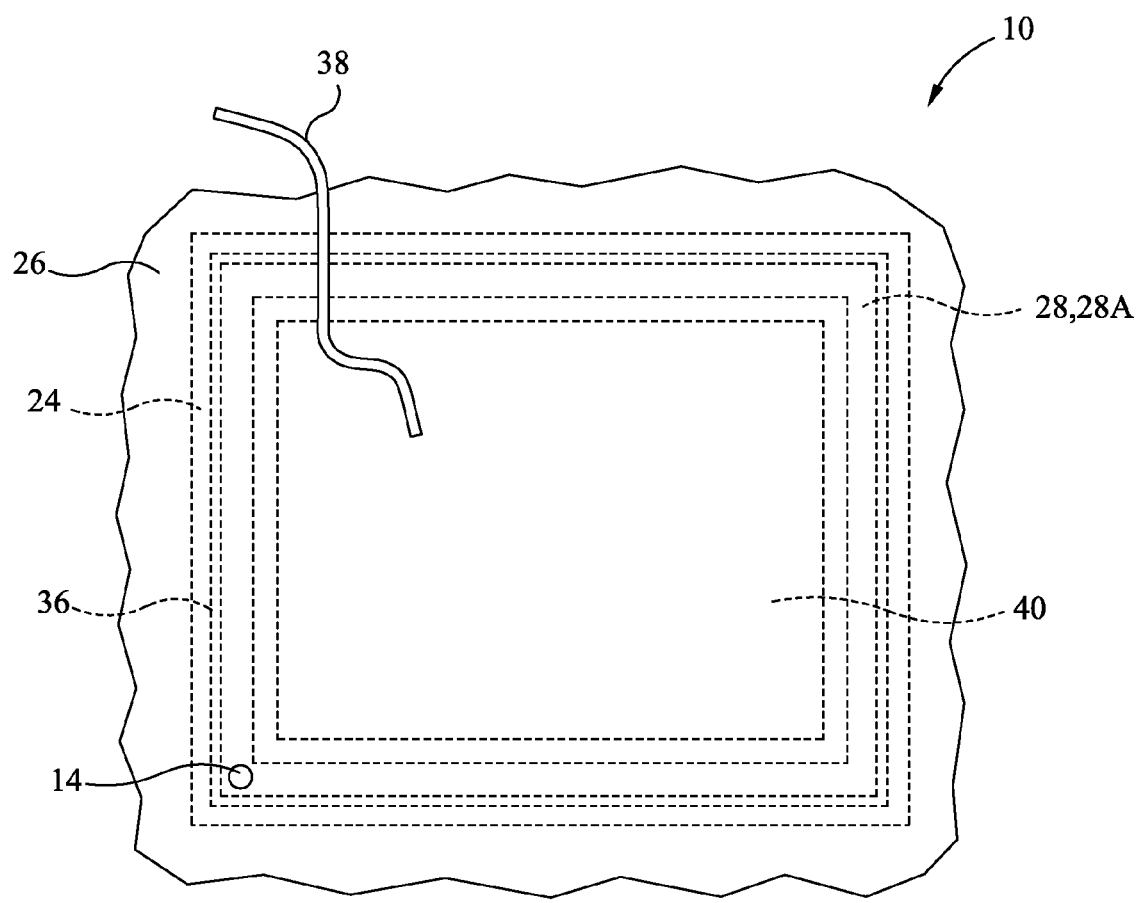
FIG. 19 is a plan view illustration of the tool leak check assembly shown in FIG. 18.
Figure 20:
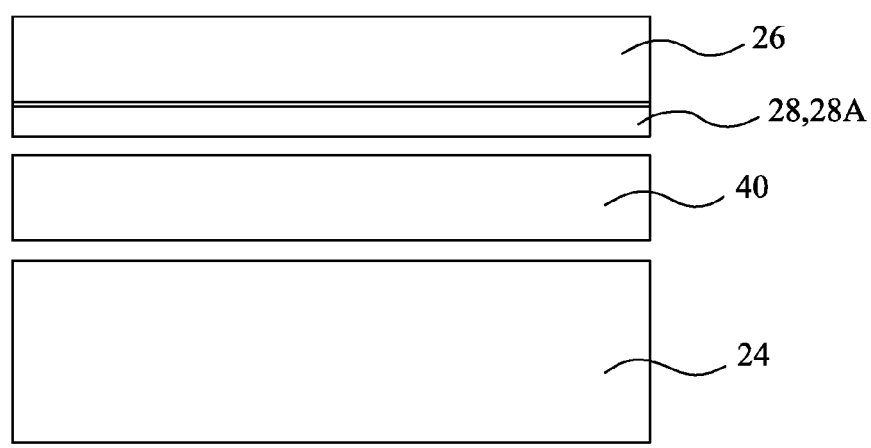
FIG. 20 is a diagrammatic illustration of the components of the tool leak check assembly including an alternative embodiment of the leak detection film.

Referring to FIGS. 19-20, the vacuum bag 26 and the LDF 28, 28a may be placed over the breather layer 40 and the tool 24. As indicated above, the vacuum bag 26 and LDF 28, 28a may be provided as separate layers or the vacuum bag 26 and LDF 28, 28a may be integral with one another. For example, the LDF 28, 28a may be co-extruded with the vacuum bag 26. In another embodiment described above, the LDF 28, 28a may comprise a coating that may be sprayed or otherwise applied to the inside face of the vacuum bag 26 as described in greater detail above.

The LDF 28, 28a may optionally be applied to the breather layer 40 such as by spraying or coating the breather layer 40 with the LDF 28, 28a material. The breather layer 40 and LDF 28, 28a may also be integrally formed with the breather layer 40 during the manufacturing of the breather layer 40. The vacuum bag 26 may be installed over the tool 24 such that the vacuum bag 26 encompasses an area of the tool 24 wherein it is desired to check for leaks. As described in detail above, when a vacuum is drawn on the vacuum bag 26 through a vacuum line 38a, the air may expose the LDF 28, 28a to gas such as oxygen at the location of the air leak resulting in a change in the physical appearance (i.e., color or light intensity) of the LDF 28, 28a at the location of the air leak.

Referring to FIGS. 18-20, the vacuum bag 26 may be similar to that which is described above with reference to FIG. 13 wherein the vacuum bag 26 may be provided as a generally flexible and substantially transparent vacuum bag 26. The vacuum bag 26 may be formed of any suitable polymeric material facilitating visual detection of a change in the appearance of the LDF 28, 28a. Likewise, the LDF 28, 28a is preferably formed as a substantially transparent LDF 28, 28a disposed along or internal with an inside face 16 of the vacuum bag 26.

The LDF may comprise any one of the above-described oxygen sensitive materials which may change in physical appearance at a location of an air leak in the tool. The change in physical appearance may comprise a change in color in the presence of oxygen and/or a change in the intensity of light emitted or reflected by the LDF. The change in physical appearance may be caused by variations in the concentration of oxygen which may occur in proportion to pressure variations under the vacuum bag. Areas with higher pressure surrounding the leak location may have a different appearance than the surrounding areas allowing a user to identify the location of the leak.

Figure 21:
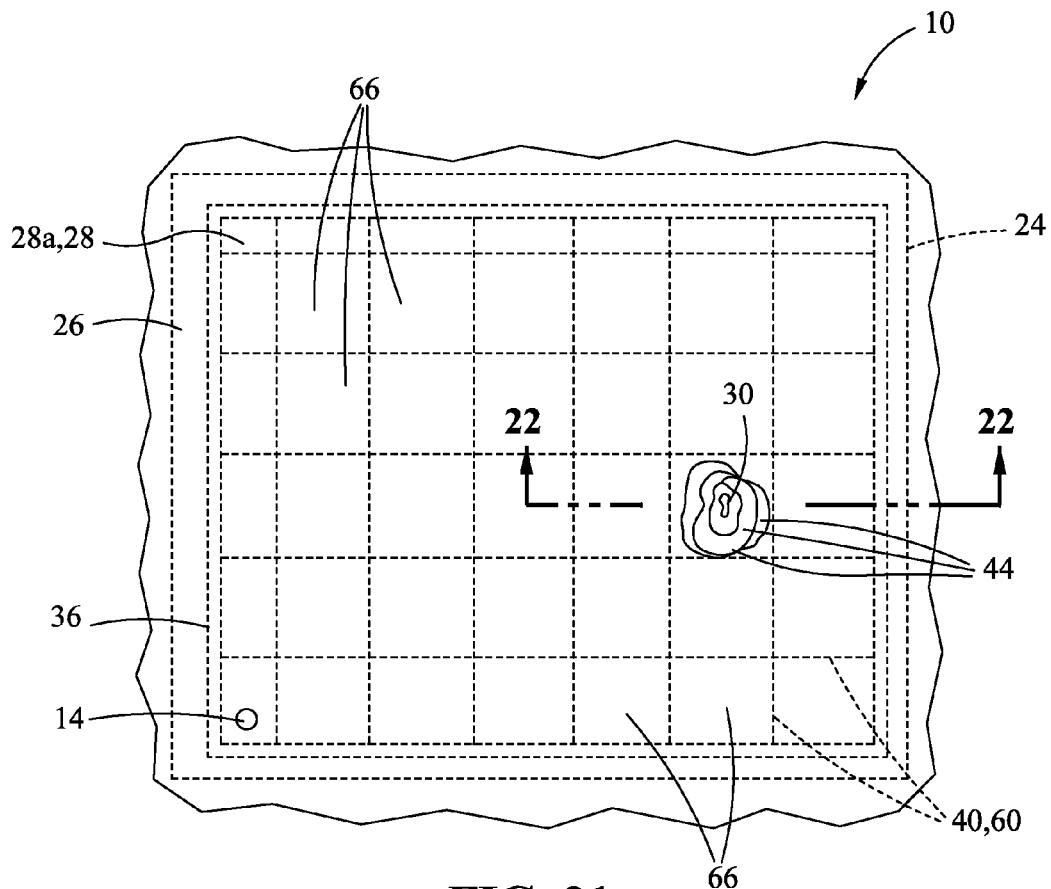
FIG. 21 is a plan view of the tool leak check assembly in an embodiment wherein the breather layer comprises netting.
Figure 22:
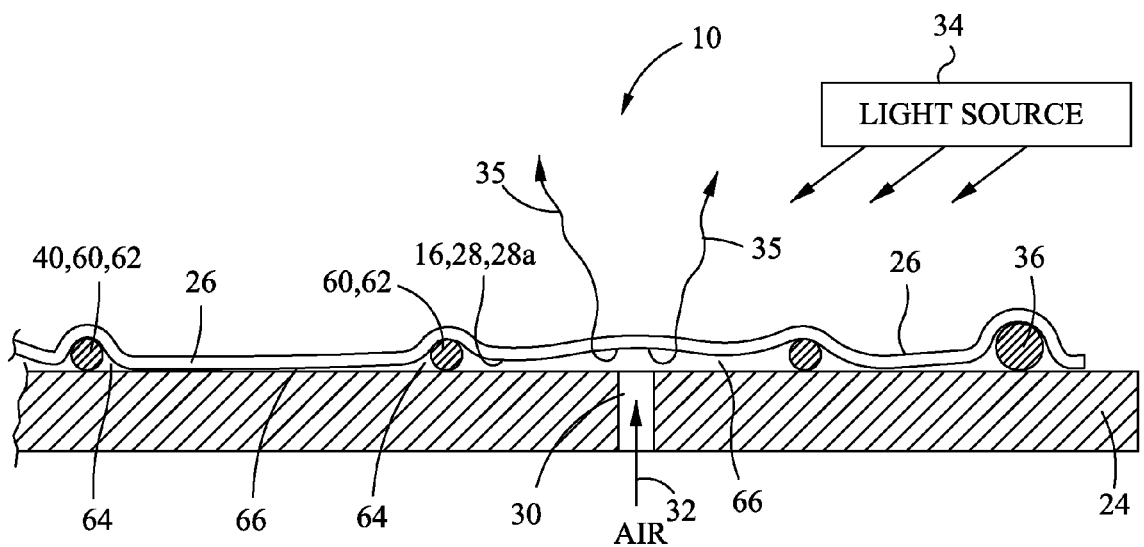
FIG. 22 is an exploded sectional illustration of the tool leak check assembly shown in FIG. 21.

Referring to FIGS. 21-22, the tool leak check assembly 10 may include an embodiment of the breather layer 40 that facilitates detection of leaks 30 with increased sensitivity. For example, the breather layer 40 may be configured as netting 60 formed of strands 62 of material such as woven fiber or cloth material. The netting 60 may be installed between the tool 24 and the LDF 28, 28a for facilitating air flow therebetween. The strands 62 of the netting 60 may intersect or criss-cross one another in any pattern such as the substantially uniformly-spaced pattern illustrated in FIG. 21 where the strands 62 intersect one another at a substantially perpendicular angle. However, the netting 60 strands 62 may be arranged in any formation. Advantageously, the netting 60 forms a plurality of cells 66 within the vacuum bag 26 for controlled flow through the vacuum bag 26.

In this regard, each one of the strands 62 may act as a spacer for locally spacing the vacuum bag 26 away from the tool 24 as illustrated in FIG. 22 and forming passageways 64 for air flowing between the tool 24 and the vacuum bag 26. The vacuum bag 26 may be pinched against the tool 24 within a portion of each one of the cells 66 such that relatively small leaks in the tool 24 may cause an increase in pressure in the cell 66 and which may be detectable using the LDF 28, 28a. For example, a relatively small air leak 30 occurring within one of the cells 66 may be detectable by a change in the physical appearance of the LDF in the area of the air leak 30 wherein the change in physical appearance may be a change in the intensity of the emitted or reflected light 35 from the LDF 28. The change in appearance may generally occur only in the area of the air leak 30. As is illustrated in FIG. 21, the change in physical appearance of the LDF 28, 28a may take the form of color bands 44 having different colors or different light intensities surrounding the air leak 30 as a result of air 32 entering through the air leak 30.

Figure 23:
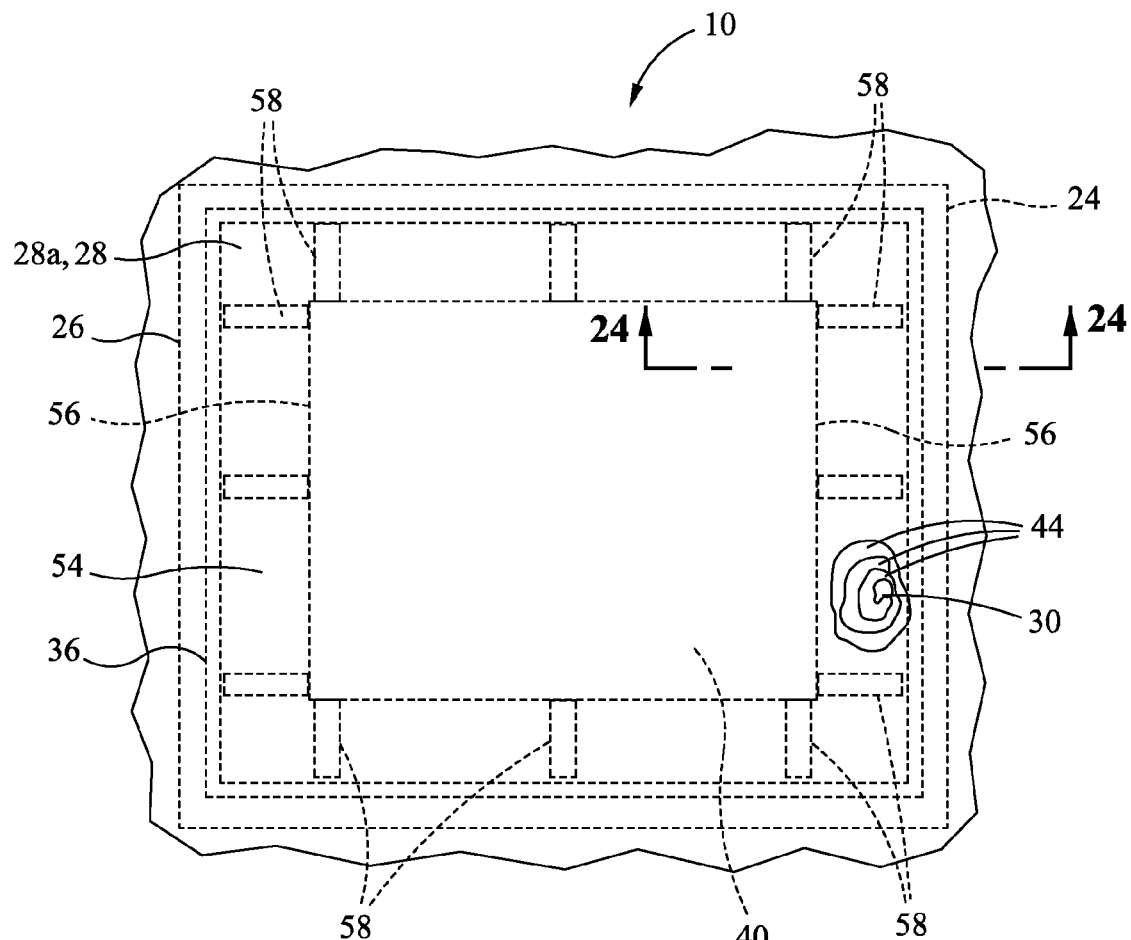
FIG. 23 is a plan view of tool leak check assembly in an embodiment having breather strips.
Figure 24:
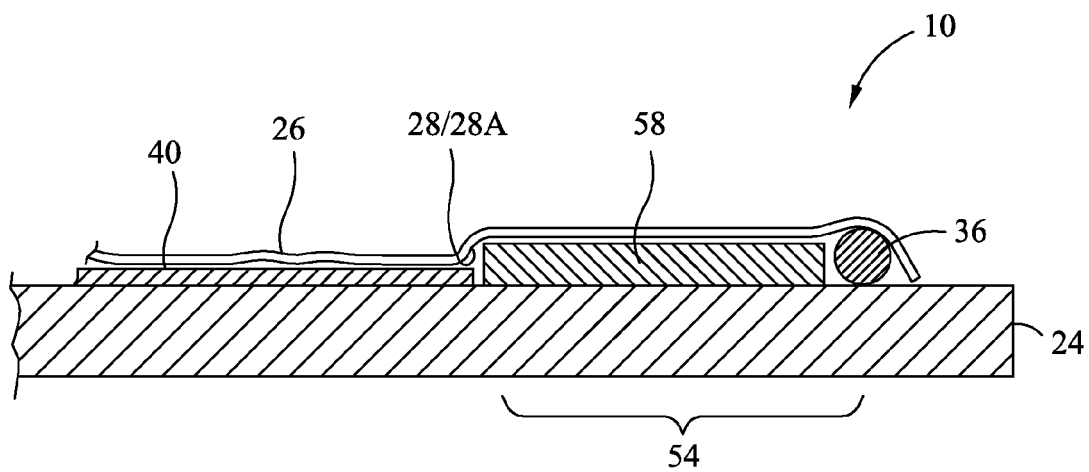
FIG. 24 is an exploded sectional illustration of the tool leak check assembly shown in FIG. 23.

Referring to FIGS. 23-24, shown is the tool leak check assembly 10 installed on a tool 24 and wherein the breather layer 40 is illustrated in an embodiment comprising a relatively lightweight breather material. The breather layer 40 may have a perimeter edge 56 that is smaller in size than the area of the tool 24 bounded by the seal 36. In this regard, the seal 36 and the perimeter edge 56 may define a gap 54 along the seal 36 within the vacuum bag 26 as best seen in FIG. 24. Breather strips 58 may be positioned within the gap 54 such as in the arrangement shown in FIG. 23 although the breather strips 58 may be positioned in any quantity and in any arrangement within the gap 54. The breather strips 58 may be formed of relatively high permeability material as compared to the breather layer 40 as best seen in FIG. 24. The breather strips 58 may segregate portions of the area along the edges of the tool 24 area sealed by the vacuum bag 26. Such breather strips 58 may reduce or prevent the expansion of air pressure from a leak 30 along the edge of the seal 36 which may reduce the ability to detect other leaks 30 or to determine the boundaries of the existing leak 30.

Figure 25:
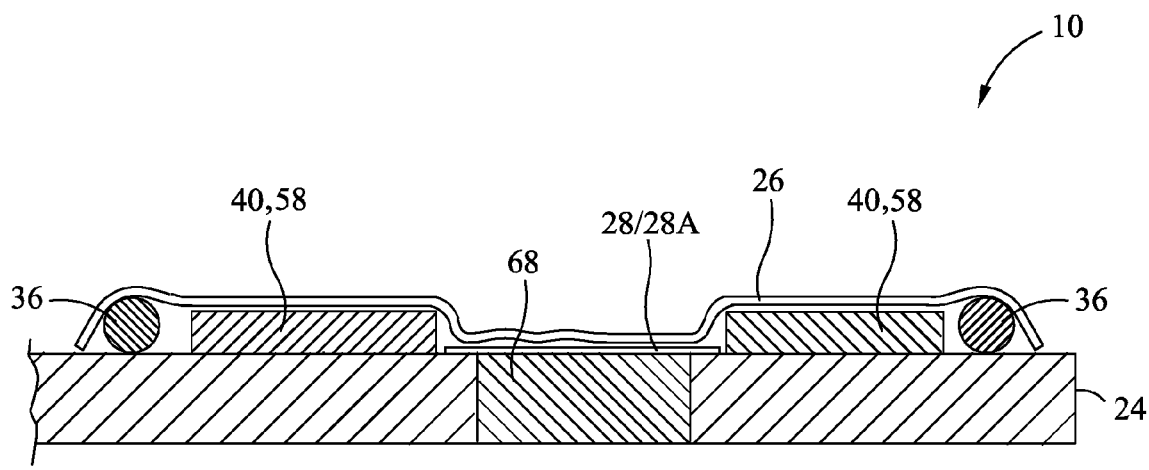
FIG. 25 is a sectional illustration of the tool leak check assembly having the leak detection film applied to the tool.

Referring to FIG. 25, shown is the tool leak check assembly 10 wherein the LDF 28, 28a is applied directly to the tool 24. The arrangement illustrated in FIG. 25 may facilitate the detection of leaks in the tool 24 such as along weld 68 areas of the tool 24 or any other area of the tool 24. The LDF 28, 28a may be applied directly to the tool 24 such as by painting or otherwise coating a localized area such as a weld 68 seam or weld 68 area of the tool 24. However, the LDF 28, 28a may be applied over any area of the tool 24 including the entirety of the tool 24 or any portion of the tool 24. The LDF 28, 28a may be applied to the tool 24 such as by spraying the LDF 28, 28a on the tool or by any other suitable means for coating the tool with the LDF 28, 28a. The vacuum bag 26 may be applied over the tool 24 such as to encompass an area of the tool 24 to which the LDF 28, 28a is applied.

Referring still to FIG. 25, the vacuum bag 26 may be sealed to the tool 24 by seals 36 or other suitable sealing means. Breather layer 40 and/or breather strips 58 may optionally be included between the vacuum bag 26 and the tool 24 to facilitate air flow between the vacuum bag 26 and the tool 24 when a vacuum is drawn on the vacuum bag 26. For example, breather strips 58 may be installed on opposing sides of the LDF or surrounding the LDF such that the vacuum bag is drawn against the LDF upon application of a vacuum to the vacuum bag. As indicated above, the breather layer or breather strips may be formed of any suitable material of any size, shape and configuration, without limitation, to facilitate the uniform application of vacuum across the area of the tool enveloped by the vacuum bag.

In any one of the above described embodiments of the vacuum bag composite part molding assembly and the tool leak check assembly, the visual detection of a change in appearance of the LDF may be performed manually by visual observation of the LDF. In addition, the change in appearance of the LDF may be facilitated by using a camera 92 (FIG. 14) and a source of light 34 (FIG. 14) as mentioned above. More specifically, the sensitivity of leak detection in the vacuum bag or in the tool may be facilitated by using the camera and source of light and by compensating for variables such as differences in thickness of the oxygen sensitive material at different locations in the vacuum bag and differences in the illumination of certain areas of the oxygen sensitive material relative to other areas of the oxygen sensitive material.

For example, the source of light may illuminate the LDF at a preselected wavelength and in a repeated pattern of cycles of a predetermined duration. In an embodiment, the light source may be activated to emit light in a succession of cycles starting at 0 microseconds ($\mu$s) and stopping at 30 $\mu$s or any other chosen interval. The camera 92 (FIG. 14) may be configured to record images of the luminescence of the LDF in timing with or in syncopation with the pattern of illumination by the light source. In this regard, the camera may be opened to record an image for the period of time when the light is emitted (e.g., from 0 μs to 30 μs). From 30-300 us, the camera is closed and no light is emitted. Several tens of thousands of images (e.g., 20,000) may be recorded and summed to generate a reference image of the LDF. An additional set of images may be recorded by the camera to generate a run image recording the rate of decay of the intensity of the luminescence of the LDF in order to determine the amount of oxygen in the area. For the run image, light may be emitted from 0-30 μs and the camera opened from 30-90 μs. From 90-300 us, the camera is closed and no light is emitted. The additional set of images may be summed to generate the run image.

The reference image may be divided by the run image in order to cancel out and remove differences in illumination resulting form the above-mentioned variations in thickness of the oxygen sensitive film and differences in the illumination of the oxygen sensitive film and other variables. The resulting image may provide a means for accurately indicating the location of air leaks wherein areas that are less intense or having a dimmer appearance represent areas having an increased rate of decay in luminescence as compared to areas having less oxygen. In this regard, the rate of decay of the intensity of the luminescence of an area of the LDF is proportional to the amount of oxygen in the area.

The rates of decay of the intensity are compared for different areas of the LDF to identify the location of leaks in the tool or in the vacuum bag such by means of software for generating a false-color image illustrating pressures across the surface of the LDF as illustrated in FIG. 14. Optionally, the reference image may be generated by recording a single image of the vacuum bag with the vacuum bag vented to atmosphere such that pressure is uniform between the vacuum bag and the tool. A vacuum may then be applied to the vacuum bag and a run image may be recorded by the camera. The reference image may be divided by the run image in order to indicate the location of air leaks which may be displayed as a false-color image illustrating pressures across the surface of the LDF as illustrated in FIG. 14.

Figure 26:
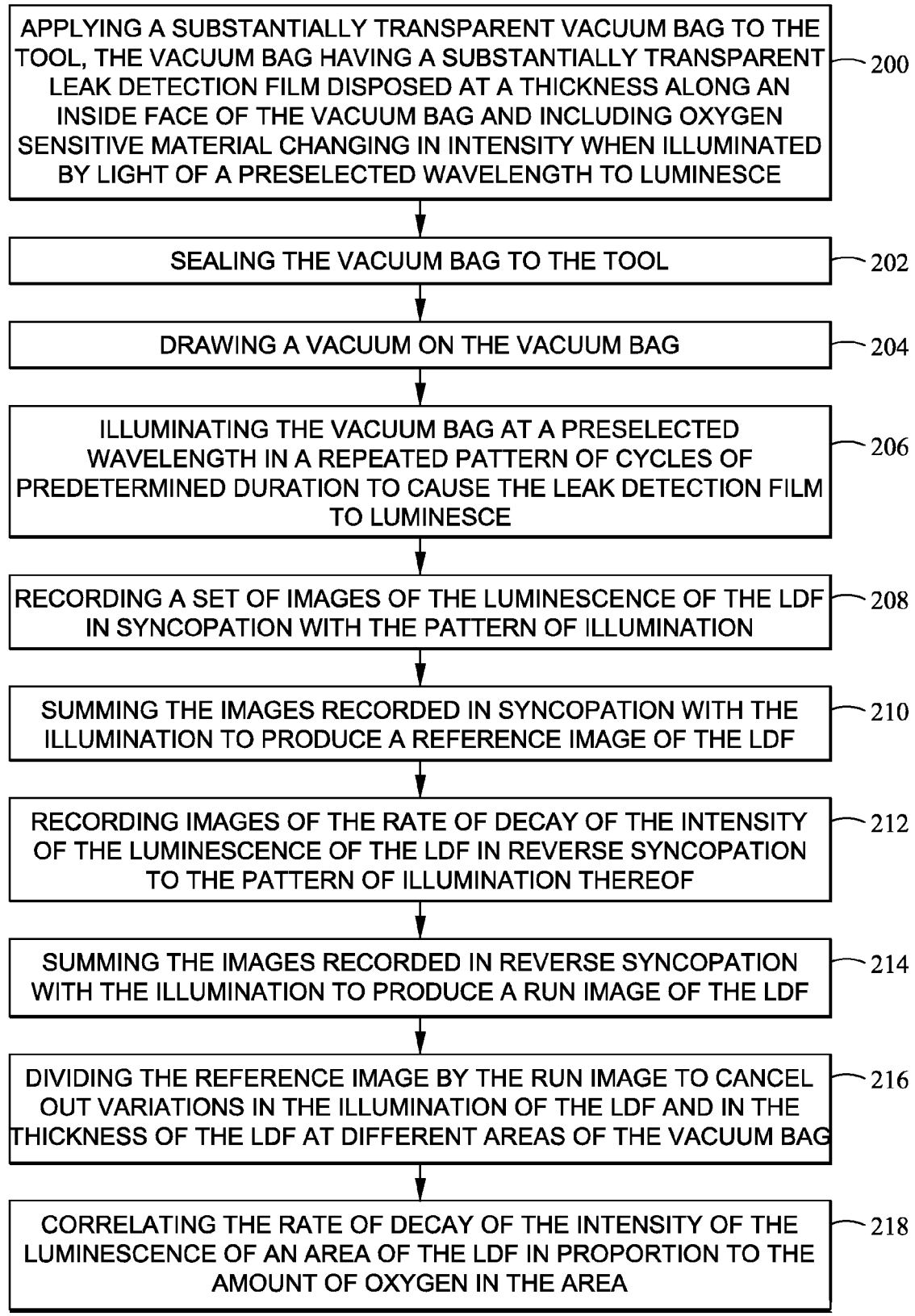
FIG. 26 is a flow diagram illustrating a methodology of identifying the location of an air leak in a tool.

Referring to FIG. 26, shown is a flow diagram illustrating a methodology of identifying the location of an air leak in a tool or in a vacuum bag covering the tool. The method may comprise step 200 of applying the vacuum bag to the tool wherein the vacuum bag includes the LDF along an inside face of the vacuum bag. The vacuum bag may be installed over the breather layer which may optionally be configured as netting and/or which may include the installation of breather strips along the seal. Step 202 may comprise sealing the vacuum bag 26 to the tool 24 such as along a strip seal 36 as illustrated in FIGS. 21-24. A breather layer 40 of any suitable configuration may be applied to the tool to facilitate the uniform application of vacuum across the vacuum bag.

Step 204 may comprise drawing a vacuum on the vacuum bag 26 through a vacuum port 14 (FIGS. 21-23) followed by illuminating the vacuum bag 26 and LDF 28 applied thereto in step 206 in order to detect either color changes or changes in the intensity of light emitted by the LDF for locating a leak in the tool or the vacuum bag. As mentioned above, the step of illuminating the vacuum bag may occur at a preselected wavelength and in a repeated pattern of cycles of predetermined duration causing the LDF to luminesce each during the illumination thereof. Step 208 may comprise recording a set of images of the luminescence of the LDF in timing with the pattern of illumination of the LDF by the source of light. More specifically, the camera may be configured to record an image for the duration of each cycle of illumination by the light source. In this manner, a reference image may be generated by summing the images recorded by the camera in step 210 wherein the images comprise the images that are recorded by the camera in syncopation with the illumination to of the LDF.

Referring still to FIG. 26, the method may comprise recording an additional set of images of the rate of decay of the intensity of the luminescence of the LDF in reverse syncopation to the pattern of illumination thereof instep 212. In this regard, the camera may record images (i.e., may be opened) each time the light source is turned off and may stop recording images (i.e., may be closed) when the light is turned back on. Tens of thousands of images may be recorded in this manner depending upon the setting by the user. Such images may be summed in step 214 to produce a run image of the LDF. Step 216 may comprise dividing the reference image by the run image in order to cancel out variations in the illumination of the LDF or in the thickness of the LDF at different areas of the vacuum bag or LDF. The resulting image illustrates the rate of decay of the intensity of the luminescence for different areas of the LDF which may be correlated in step 218 to the amount of oxygen in the area. Because the rate of decay of the intensity of the luminescence is proportional to the amount of oxygen in an area, areas of the tool having leaks may appear less intense than areas with no leaks. In this manner, the LDF may facilitate the identification of leaks in the tool or in the vacuum bag.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A device for detecting an air leak in a tool, comprising:
    a vacuum bag comprising a polymer sheet applied over a pre-form composite part, said vacuum bag sealable to the tool;
    a leak detection film disposed between the vacuum bag and the tool and including oxygen sensitive material configured to change physical appearance at a location of an air leak in the tool wherein portions of the leak detection film are removable from the polymer sheet; and
    a breather layer interposed between the tool and the vacuum bag for facilitating air flow therebetween.

2. The device of claim 1 wherein the breather layer comprises at least one layer of woven fiber material.

3. The device of claim 1 wherein the breather layer comprises netting having a plurality of strands, each one of the strands spacing the vacuum bag away from the tool.

4. The device of claim 1 wherein the leak detection film is substantially transparent to facilitate visual observation of changes in the appearance of the leak detection film.

5. The device of claim 1 wherein the removable portions form a grid pattern.

6. The device of claim 1 wherein the leak detection film is bonded to an inside face of the vacuum bag.

7. The device of claim 1 wherein the leak detection film is co-extruded with the vacuum bag.

8. The device of claim 1 wherein the leak detection film includes an oxygen permeable binder, the oxygen sensitive material being held in the binder.

9. The device of claim 8 wherein the oxygen sensitive material includes light sensitive nano-particles responsive to light of a predetermined wavelength for emitting light indicating the location of the air leak.

10. The device of claim 1 wherein the oxygen sensitive material is excited by light of a preselected wavelength causing the oxygen sensitive material to luminesce, the intensity of the luminescence changing due to the presence of oxygen caused by the air leak.

11. The device of claim 10 wherein the leak detection film includes a dye for coloring the luminescence of the oxygen sensitive material.

12. A method of detecting a leak in one of a tool and a vacuum bag, comprising the steps of:
   applying a vacuum bag to the tool such that the vacuum bag covers a pre-form composite part, the vacuum bag having a leak detection film disposed between the vacuum bag and the tool and including oxygen sensitive material configured to change physical appearance in the presence of oxygen;
   removing a portion of the leak detection film from the vacuum bag, said portion being adjacent to a seal surrounding the pre-form composite part;
   sealing the vacuum bag to the tool;
   drawing a vacuum on the vacuum bag; and
   inspecting the vacuum bag for a change in physical appearance to detect the presence of a leak in one of the tool and the vacuum bag.

13. The method of claim 12 further comprising the step of:
   illuminating the vacuum bag with light of a wavelength causing the leak detection film to luminesce; and
   correlating the change in the luminescence of the leak detection film to the existence of an air leak.

14. The method of claim 13 further comprising the steps of:
   measuring the rate of decay of the intensity of the luminescence; and
   correlating the rate of decay to the amount of oxygen in the area.

15. The method of claim 12 further comprising the step of:
   installing a breather layer between the tool and the leak detection film to facilitate air flow therebetween.

16. The method of claim 15 wherein the step of installing the breather layer comprises:
   installing netting having a plurality of strands for spacing the vacuum bag away from the tool.

17. The method of claim 12 wherein the step of applying the vacuum bag to the tool comprises applying a seal to the tool and applying the vacuum bag to the seal, the step of installing the breather layer between the tool and the leak detection film comprising:
   forming the breather layer such that a perimeter edge thereof defines a gap with the seal; and
   installing at least one breather strip between the perimeter edge and the seal.

* * * * *